US012007830B2

(12) United States Patent
Harutyunyan et al.

(10) Patent No.: US 12,007,830 B2
(45) Date of Patent: Jun. 11, 2024

(54) METHODS AND SYSTEMS FOR RESOLVING PERFORMANCE PROBLEMS WITH OBJECTS OF A DATA CENTER

(71) Applicant: VMware LLC, Palo Alto, CA (US)

(72) Inventors: Ashot Nshan Harutyunyan, Yerevan (AM); Arnak Poghosyan, Yerevan (AM); Lilit Harutyunyan, Yerevan (AM); Nelli Aghajanyan, Yerevan (AM); Tigran Bunarjyan, Yerevan (AM); Marine Harutyunyan, Yerevan (AM); Sam Israelyan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/871,080

(22) Filed: Jul. 22, 2022

(65) Prior Publication Data

US 2024/0028442 A1   Jan. 25, 2024

(51) Int. Cl.
*G06F 11/07*    (2006.01)
*G06F 11/34*    (2006.01)

(52) U.S. Cl.
CPC ........ *G06F 11/079* (2013.01); *G06F 11/0769* (2013.01); *G06F 11/3447* (2013.01)

(58) Field of Classification Search
CPC .............. G06F 11/079; G06F 11/3034; G06F 11/3447; G06F 11/0727; G06F 11/0766
See application file for complete search history.

(56) References Cited

U.S. PATENT DOCUMENTS

| | | | |
|---|---|---|---|
| 2020/0117529 A1* | 4/2020 | Qiao | G06T 19/006 |
| 2020/0192738 A1* | 6/2020 | Sarkar | G06F 11/0751 |
| 2021/0406671 A1* | 12/2021 | Gasthaus | G06F 40/20 |
| 2022/0214936 A1* | 7/2022 | Le | G06N 5/01 |
| 2022/0382784 A1* | 12/2022 | Osuala | G06F 16/285 |
| 2023/0205618 A1* | 6/2023 | Xue | G06F 11/0709 |
| | | | 714/37 |

\* cited by examiner

*Primary Examiner* — Yolanda L Wilson
(74) *Attorney, Agent, or Firm* — Quarles & Brady LLP

(57) ABSTRACT

Automated, computer-implemented methods and systems for resolving performance problems with objects executing in a data center are described. The automated methods use machine learning to train a model that comprises rules defining relationships between probabilities of event types of in log messages and values of a key performance indictor ("KPI") of the object over a historical time period. When a KPI violates a corresponding threshold, the rules are used to evaluate run time log messages that describe the probable root cause of the performance problem. An alert identifying the KPI threshold violation, and the log messages are displayed in a graphical user interface of an electronic display device.

15 Claims, 25 Drawing Sheets

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 6

```
[2019-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547300076663429) finished}
```

FIG. 7

| Grok pattern — 932 | Regular Expression (Regex) — 934 |
|---|---|
| INT | (?:[+-]?(?:[0-9]+)) |
| POSINT | \b(?:[1-9][0-9]*)\b] |
| BASE10NUM | (?<![0-9.+-])(?>[+-]?(?:(?:[0-9]+(?:\.[0-9]+)?)\|(?:\.[0-9]+))) |
| USERNAME — 936 | [a-zA-Z0-9._-]+ —— 938 |
| YEAR | (?>\d\d){1,2} |
| MONTH | b(?:Jan(?:uary)?\|Feb(?:ruary)?\|Mar(?:ch)?\|Apr(?:il)?\|May\|Jun(?:e)?\|Jul(?:y)?\|Aug(?:ust)?\|Sep(?:tember)?\|Oct(?:ober)?\|Nov(?:ember)?\|Dec(?:ember)?)\b |
| MONTHNUM | (?:0?[1-9]\|1[0-2]) |
| DAY | (?:Mon(?:day)?\|Tue(?:sday)?\|Wed(?:nesday)?\|Thu(?:rsday)?\|Fri(?:day)?\|Sat(?:urday)?\|Sun(?:day)?) |
| HOUR | (?:2[0123]\|[01]?[0-9]) |
| MINUTE | (?:[0-5][0-9]) |
| SECOND | (?:(?:[0-5][0-9]\|60)(?:[:.,][0-9]+)?) |
| EMAILLOCALPART | [a-zA-Z][a-zA-Z0-9_.+-=:]+ |
| IPV4 | (?<![0-9])(?:(?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2})(?![0-9])) |
| HOSTNAME — 940 | \b(?:[0-9A-Za-z][0-9A-Za-z-]{0,62})(?:\.(?:[0-9A-Za-z][0-9A-Za-z-]{0,62}))*(\.?\|\b) — 942 |
| SPACE | \s* |

FIG. 9B

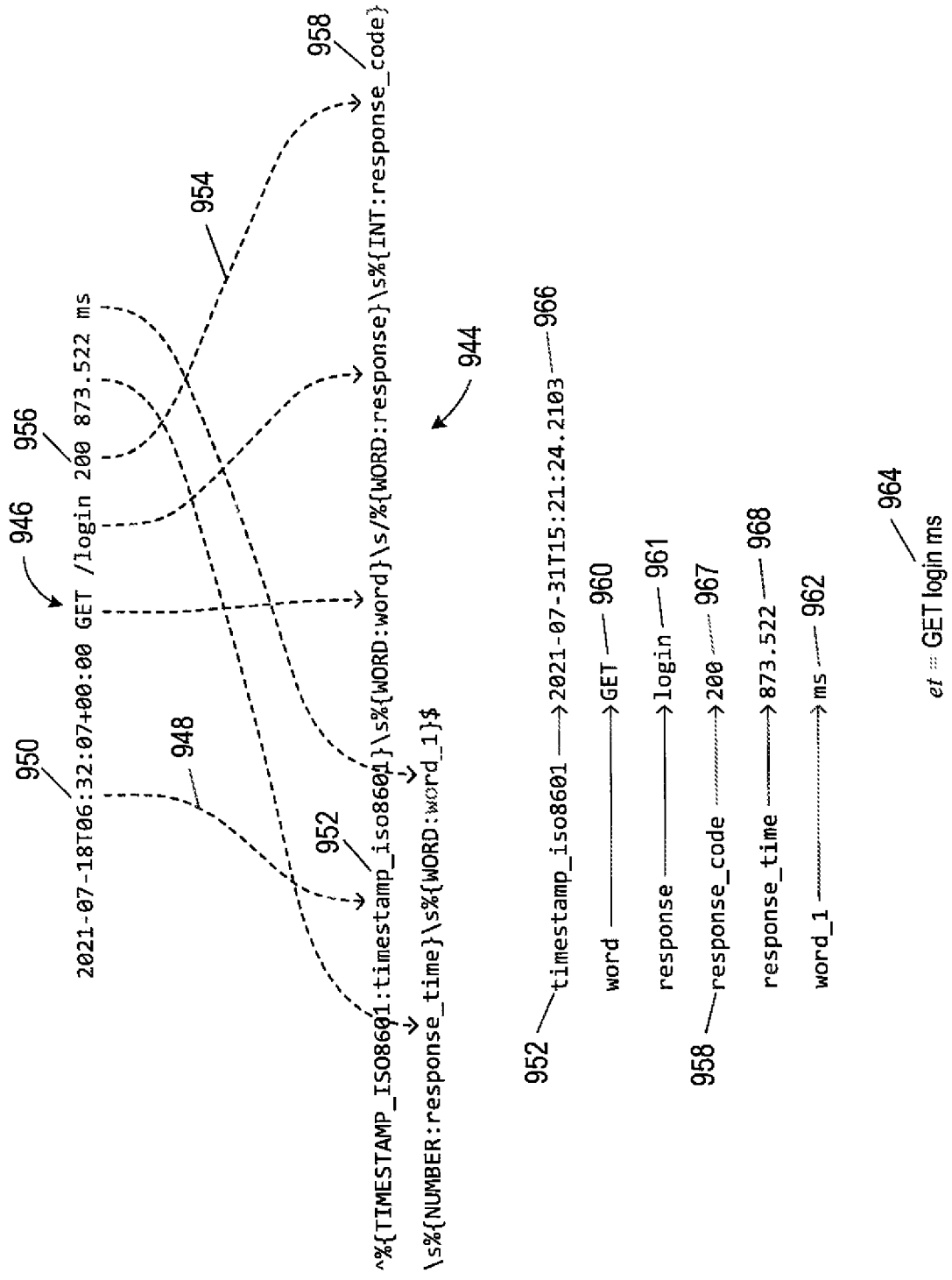

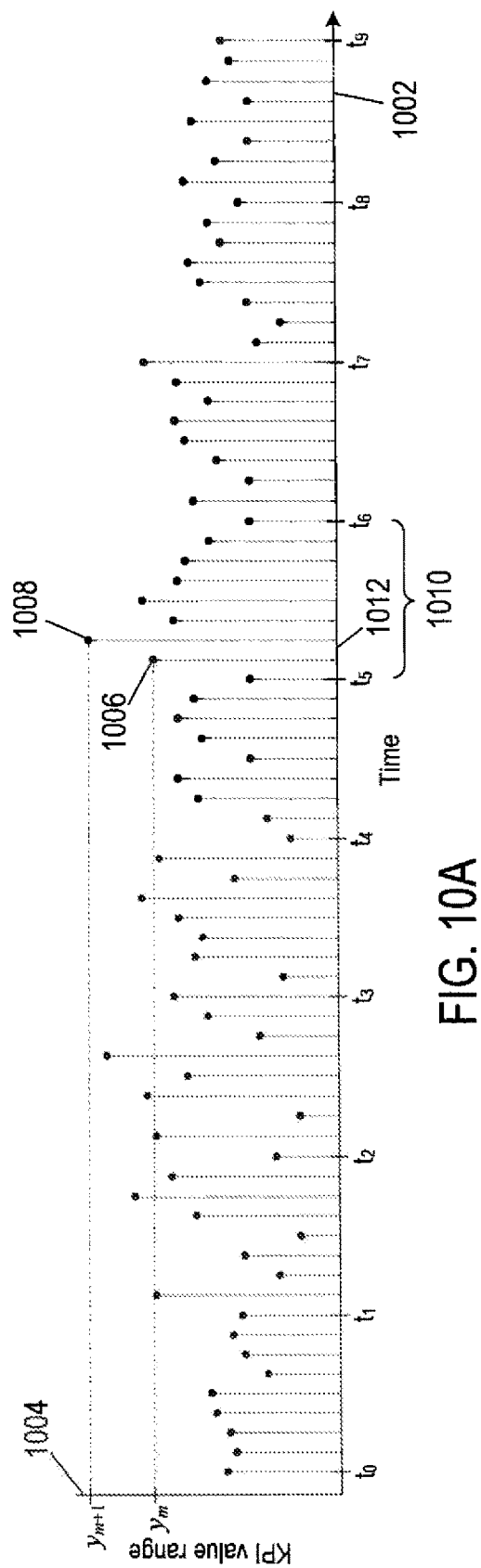
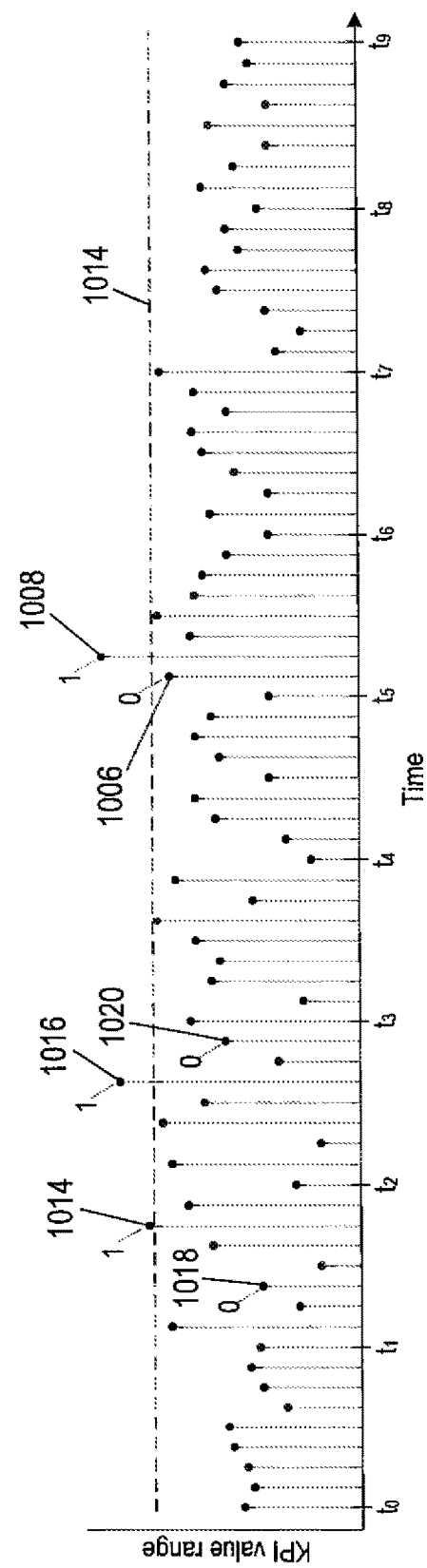
FIG. 10A
FIG. 10B

METHODS AND SYSTEMS FOR RESOLVING PERFORMANCE PROBLEMS WITH OBJECTS OF A DATA CENTER

TECHNICAL FIELD

This disclosure is directed to resolving performance problems with objects executing in a data center, and in particular, to identifying potential root cause of performance problems.

BACKGROUND

Electronic computing has evolved from primitive, vacuum-tube-based computer systems, initially developed during the 1940s, to modern electronic computing systems in which large numbers of multi-processor computer systems, such as server computers and workstations, are networked together with large-capacity data-storage devices to produce geographically distributed computing systems that provide enormous computational bandwidths and data-storage capacities. These large, distributed computing systems include data centers and are made possible by advancements in virtualization, computer networking, distributed operating systems and applications, data-storage appliances, computer hardware, and software technologies. The number and size of data centers has grown in recent years to meet the increasing demand for information technology ("IT") services, such as running applications for organizations that provide business services, web services, streaming services, and other cloud services to millions of users each day.

Advancements in virtualization and software technologies provide many advantages for development and deployment of applications in data centers. Enterprises, governments, and other organizations now conduct commerce, provide services over the internet, and process large volumes of data using distributed applications executed in data centers. A distributed application comprises multiple software components that are executed in virtual machines ("VMs"), or in containers, on multiple server computers of a data center. The software components communicate and coordinate data processing and data stores to appear as a single coherent application that provides services to end users. Data centers run tens of thousands of distributed applications in VMs and containers that can be scaled up or down to meet customer and client demands. For example, VMs that provide a service can be created to satisfy increasing demand for services and deleted when demand for the services decreases, which frees up computing resources. VMs and containers can also be migrated to different host server computers within a data center to optimize use of resources.

Data center management tools have been developed to monitor the performance of applications and objects executing in a data center. Management tools collect metrics, such as CPU usage, memory usage, disk space available, and network throughput to monitor performance of data center resources. Data center tenants and system administrators rely on key performance indicators ("KPIs") to monitor the overall health and performance of applications and objects executing in a data center. A KPI can be constructed from one or more metrics. KPIs that do not depend on metric can also be used to monitor performance of applications. For example, a KPI for an online shopping application could be the number of shopping carts successfully closed per unit time. A KPI for a website may be response times to customer requests. Other KPIs can be used to monitor performance of various services provided by different components of a distributed application. Consider, for example, a distributed application that provides banking services via a bank website or a mobile application ("mobile app"). One component provides front-end services that enable users to input banking requests and receive responses to requests via the website or the mobile app. Other components of the distributed application provide back-end services that are executed in VMs running on hosts of the data center. These services include processing user banking requests, maintaining data storage, and retrieving user information from data storage. Each of these services can be monitored with an error rate KPI and a time span KPI.

Although KPIs are useful for monitoring the health and performance of applications and objects. KPIs are typically not helpful in revealing the root causes of health issues or performance problems. For example, a sudden increase in a response time KPI is useful in revealing a problem that customers are experiencing, but the KPI does not reveal the root cause of the increase in response times. The increase may be due to any number of issues. For example, any one of the application components running in separate VMs may be contending for CPU time or for available memory of a host. A central application component may have stopped responding to requests from other application components because the host the component runs on is experiencing performance issues.

Because typical management tools cannot identify the root cause of most problems occurring in a data center, the search for root causes of performance problems is performed by teams of software engineers. Each team searches for a root cause of a problem by manually searching for issues in metrics and log messages. However, the troubleshooting process can take days and weeks, and in some cases longer. Data center tenants cannot afford such long periods of time spent sifting through various metrics, log messages, and lines of code for a root cause of a problem. Employing teams of engineers to spend days and weeks to search for a problem is expensive and error prone. Problems with a data center tenant's applications result in downtime and continue the slow performance of their applications, which frustrates users, damages a brand name, causes lost revenue, and in many cases can deny people access to services provided by data center tenants. Systems administrators and data center tenants seek automated methods and systems that identify root causes of run-time problems and significantly reduce, or even eliminate, reliance on teams of engineers to identify the root causes of performance issues.

SUMMARY

This disclosure is directed to automated, computer-implemented methods and systems for resolving performance problems with objects executing in a data center. The automated methods are executed by an operations manager that runs in a host of the data center. The operations manager collects log messages from event sources associated with a data center object. Each log message is an unstructured or semi-structured time-stamped message that records an event that occurred during execution of the object, execution of an operating system, execution of a service provided by the object, or an issue occurring with the object. The log messages are stored in log files. The operations manager uses machine learning to train a model that comprises rules defining relationships between probabilities of event types of the log messages and values of a key performance indictor ("KPI") of the object over a historical time period. The operations manager monitors the KPI during run-time of the object. In response to detecting a run-time KPI violation of a KPI threshold, probabilities of event types of log messages recorded in a run-time interval are determined. The operations manager uses the rules to evaluate the event type probabilities for important event types. Log messages with the important event types and generated in the run-time interval are identified. An alert identifying the KPI threshold violation, and the log messages are displayed in a graphical user interface of an electronic display device. The log messages describe the probable root cause of the performance problem, which enables identification of diagnosis of the performance problem with the object.

DESCRIPTION OF THE DRAWINGS

FIG. 6 shows an example of a log write instruction.

FIG. 7 shows an example of a log message generated by the log write instruction in FIG. 6.

FIG. 9B shows a table of examples primary Grok patterns and corresponding regular expressions.

FIG. 9C shows an example of a Grok expression used to extract tokens from a log message.

FIG. 10A shows an example plot of a key performance indicator ("KPI") associated with an object of a data center.

FIG. 10B shows a plot of the KPI values in FIG. 10A with a threshold that separates outlier KPI values from normal KPI values.

DETAILED DESCRIPTION

This disclosure presents automated methods and systems for resolving performance problems with applications executing in a data center object. Log messages, event types, and key performance indicators are described in a first subsection. Automated methods and systems for resolving performance problems with applications executing in a data center are described in a second subsection.

Log Messages, Event Types, and Key Performance Indicators

Figure 1:
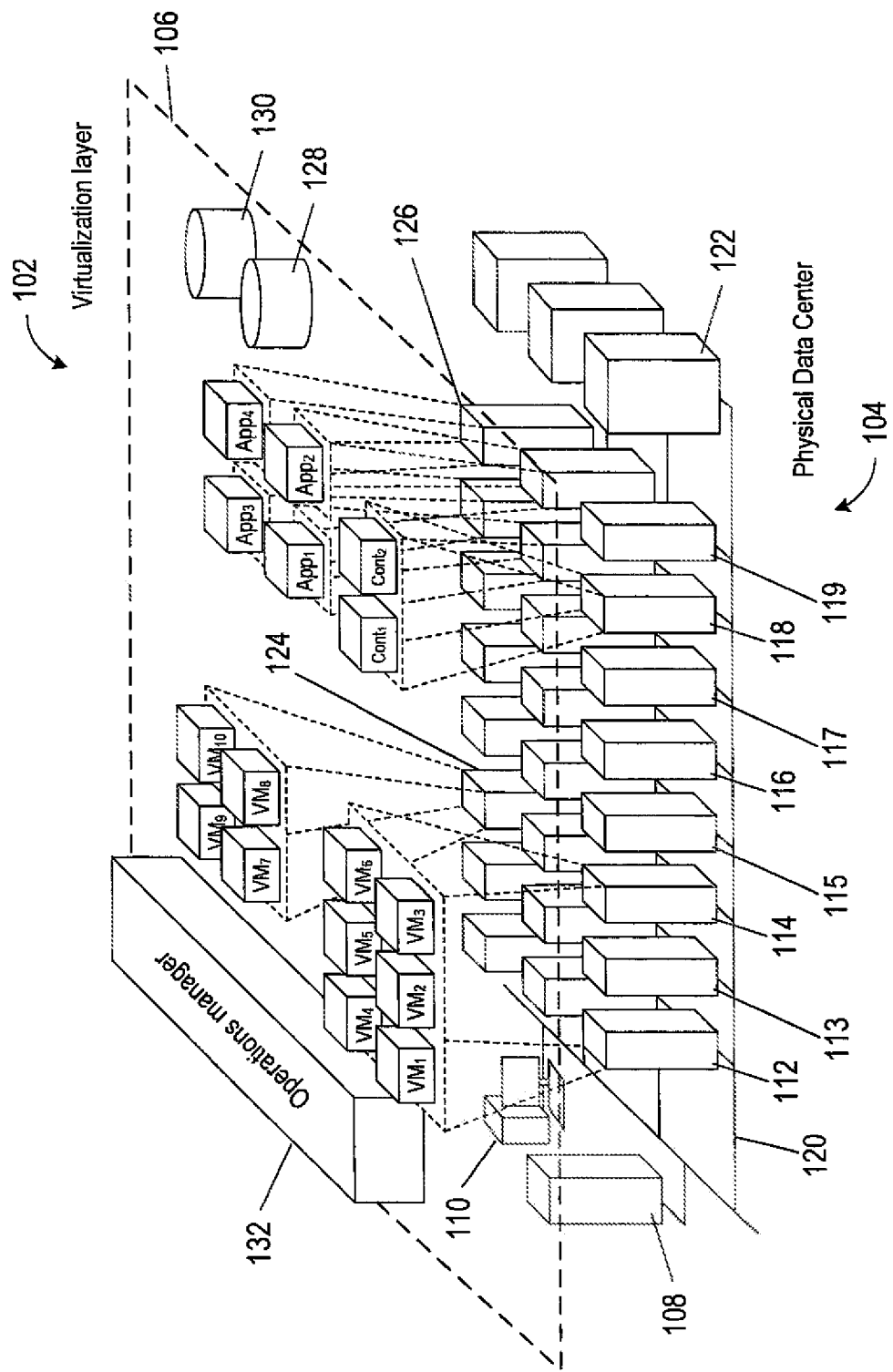
FIG. 1 shows an example of a virtualization layer located above a physical data center.

FIG. 1 shows an example of a virtualization layer 102 located above a physical data center 104. For the sake of illustration, the virtualization layer 102 is separated from the physical data center 104 by a virtual-interface plane 106. The physical data center 104 is an example of a distributed computing system. The physical data center 104 comprises physical objects, including an administration computer system 108, any of various computers, such as PC 110, on which an operations management interface may be displayed in a graphical user interface to system administrators and other users, server computers, such as server computers 112-119, data-storage devices, and network devices. The server computers may be networked together to form server-computer groups within the data center 104. The example physical data center 104 includes three server-computer groups each of which have eight server computers. For example, server-computer group 120 comprises interconnected server computers 112-119 that are connected to a mass-storage array 122. Within each server-computer group, certain server computers are grouped together to form a cluster that provides an aggregate set of resources (i.e., resource pool) to objects in the virtualization layer 102. Different physical data centers may include many different types of computers, networks, data-storage systems, and devices connected according to many different types of connection topologies.

The virtualization layer 102 includes virtual objects, such as virtual machines ("VMs"), applications, and containers, hosted by the server computers in the physical data center 104. A VM is a compute resource that uses software instead of a physical computer to run programs and deploy applications. One or more VMs run on a physical "host" server computer. Each VM runs its own operating system called a "guest operating system" and functions separately from the other VMs, even though the VMs may all be running on the same host. While VMs virtualize the hardware layer to create a virtual computing environment, a container contains a single program or application along with dependencies and libraries and containers share the same operating system. Multiple containers are run in pods on the same server computers. The virtualization layer 102 may also include a virtual network (not illustrated) of virtual switches, routers, load balancers formed from the physical switches, routers, and NICs of the physical data center 104. Certain server computers host VMs while other host containers. For example, server computer 118 hosts two containers identified as $Cont_1$ and $Cont_2$; cluster of server computers 112-114 host six VMs identified as $VM_1$, $VM_2$, $VM_3$, $VM_4$, $VM_5$, and $VM_6$; server computer 124 hosts four VMs identified as $VM_7$, $VM_8$, $VM_9$, $VM_{10}$. Other server computers may host applications. For example, server computer 126 hosts an application identified as $App_4$. The virtual-interface plane 106 abstracts the resources of the physical data center 104 to one or more VDCs comprising the virtual objects and one or more virtual data stores, such as virtual data stores 128 and 130. For example, one VDC may comprise the VMs running on server computer 124 and virtual data store 128.

Automated methods and systems described below are performed by an operations manager 132 that is executed in one or more VMs on the administration computer system 108. The operations manager 132 is an automated computer implemented tool that aids IT administrators with monitoring, troubleshooting, and managing the health and capacity of the data center virtual environment. The operations manager 132 provides management across physical, virtual, and cloud environments. The operations manager 132 receives object information, which includes streams of metric data and log messages from various physical and virtual objects of the data center described below.

Figure 2A:
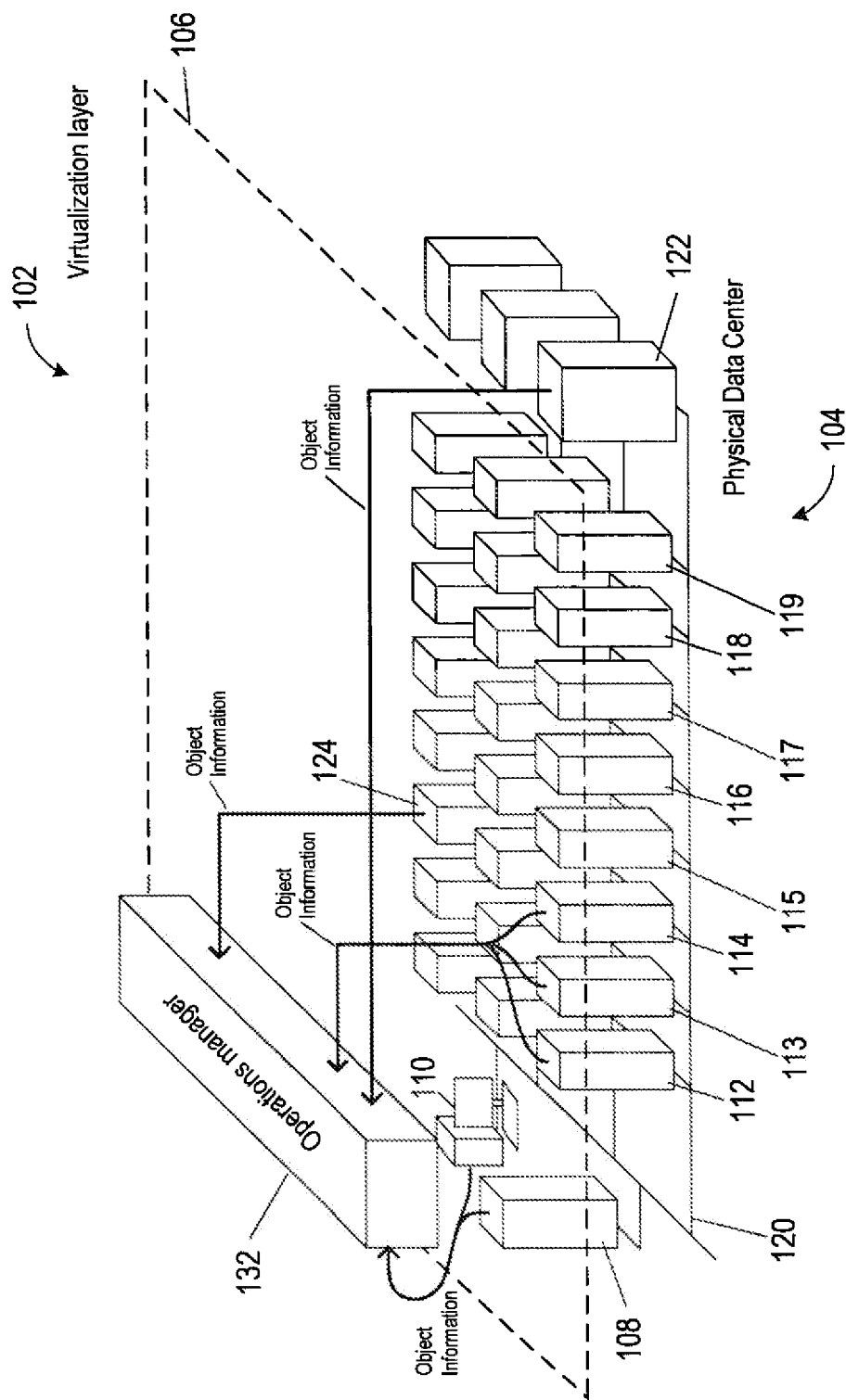
FIGS. 2A-2B shows an operations manager that receives object information from various physical and virtual objects.
Figure 2B:
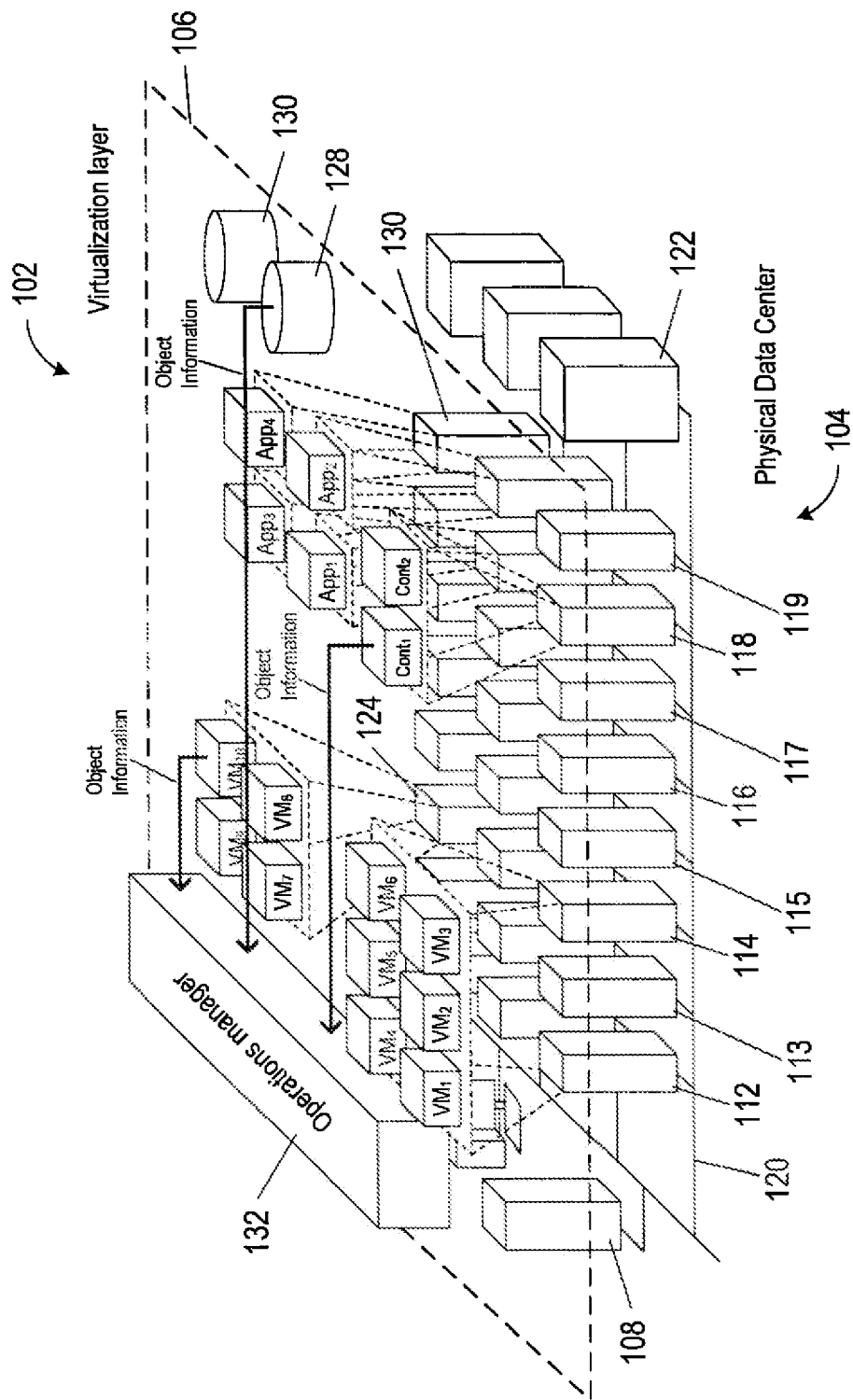

FIGS. 2A-2B show examples of the operations manager 132 receiving object information from various physical and virtual objects. Directional arrows represent object information sent from physical and virtual resources to the management server 132. In FIG. 2A, the operating systems of PC 110, server computers 108 and 124, and mass-storage array 122 send object information to the operations manager 132. A cluster of server computers 112-114 send object information to the operations manager 132. In FIG. 2B, the VMs, containers, applications, and virtual storage may independently send object information to the operations manager 132. Certain objects may send metrics as the object information is generated while other objects may only send object information at certain times or when requested to send object information by the operations manager 132. The operations manager 132 may be implemented in a VM to collect and processes the object information as described below to detect performance problems and generate recommendations to correct the performance problems. Depending on the type of the performance problem, recommendations include reconfiguring a virtual network of a VDC or migrating VMs from one server computer to another, powering down server computers, replacing VMs disabled by physical hardware problems and failures, spinning up cloned VMs on additional server computers to ensure that services provided by the VMs are accessible to increasing demand or when one of the VMs becomes compute or data-access bound.

Figure 3:
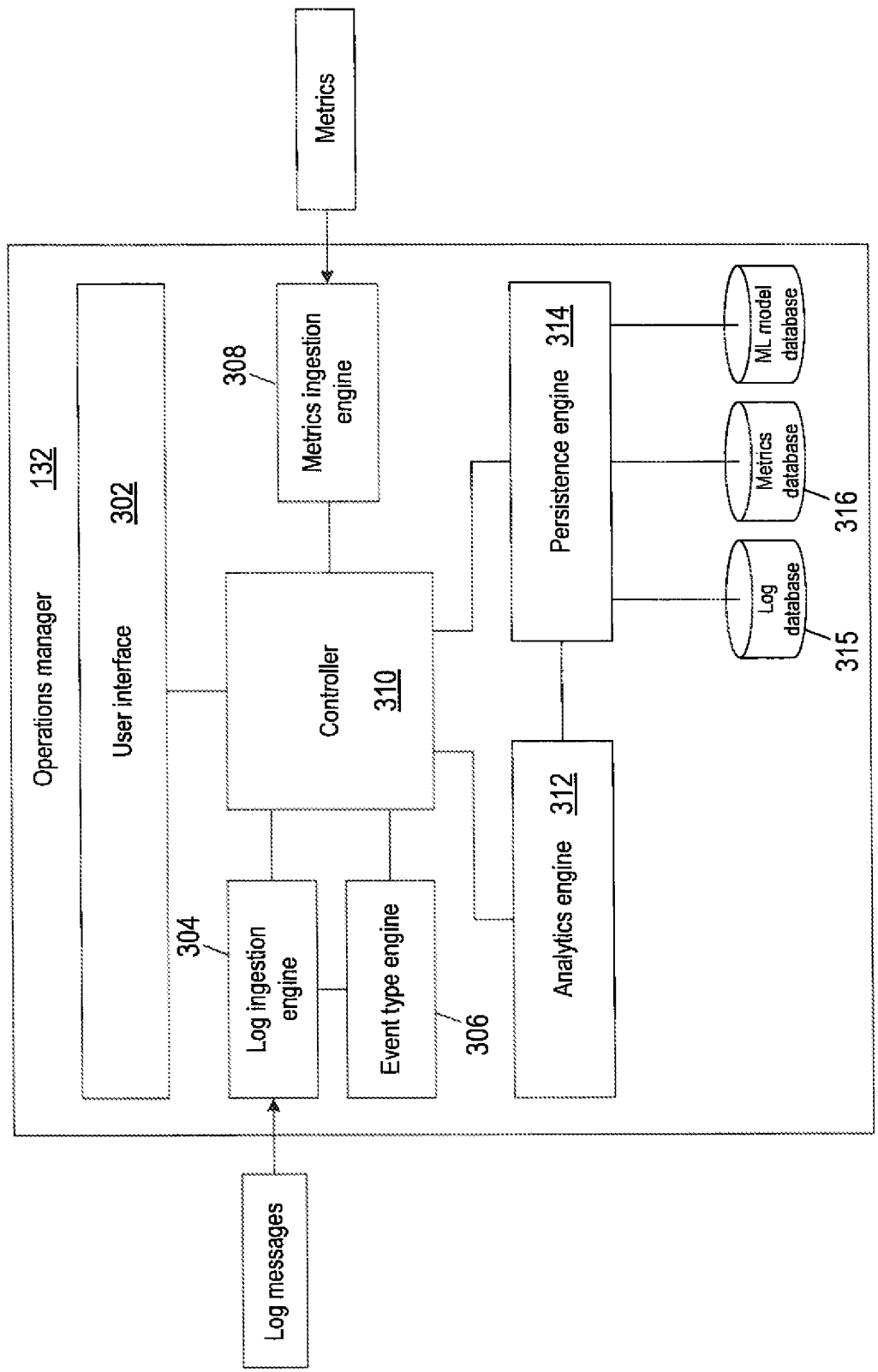
FIG. 3 shows an example architecture of an operations manager.

FIG. 3 shows an example architecture of the operations manager 132. This example architecture includes a user interface 302 that provides graphical user interfaces for data center management, system administrators, and application owners to receive alerts, view metrics, log messages, and KPIs, and execute recommended remedial measures to correct performance problems. The operations manager 132 includes a log ingestion engine 304 that receives log messages sent from log monitoring agents deployed at sources of log messages described below with reference to FIGS. 4-8, and an event type engine 306 that extracts event types from the log messages, as described below with reference to FIGS. 9A-9C. The operations manager 132 includes a metrics ingestion engine 308 that receives metrics from agents deployed at sources of metric data. The operations manager 132 includes a controller 310 that manages and directs the flow of object information collected by the engines 304 and 308. The controller 310 manages the user interface 302 and directs the flow of instructions received via the user interface 302 and the flow of information displayed on the user interface 302. The controller 310 directs the flow of object information to the analytics engine 312. The analytics engine 312 performs system health assessments by monitoring key performance indicators ("KPIs") for problems with applications or other data center objects, maintains dynamic thresholds of metrics, and generates alerts in response to KPIs that violate corresponding thresholds. The analytics engine 312 uses machine learning ("ML") as described below to generate models that are used to generate rules for interpreting degradation of a KPI or indicate the most influential dimensions/features for a long-term explanation of those degradations. The persistence engine 314 stores metrics, log messages, and the models in corresponding data bases 315-317.

Log Messages

Figure 4:
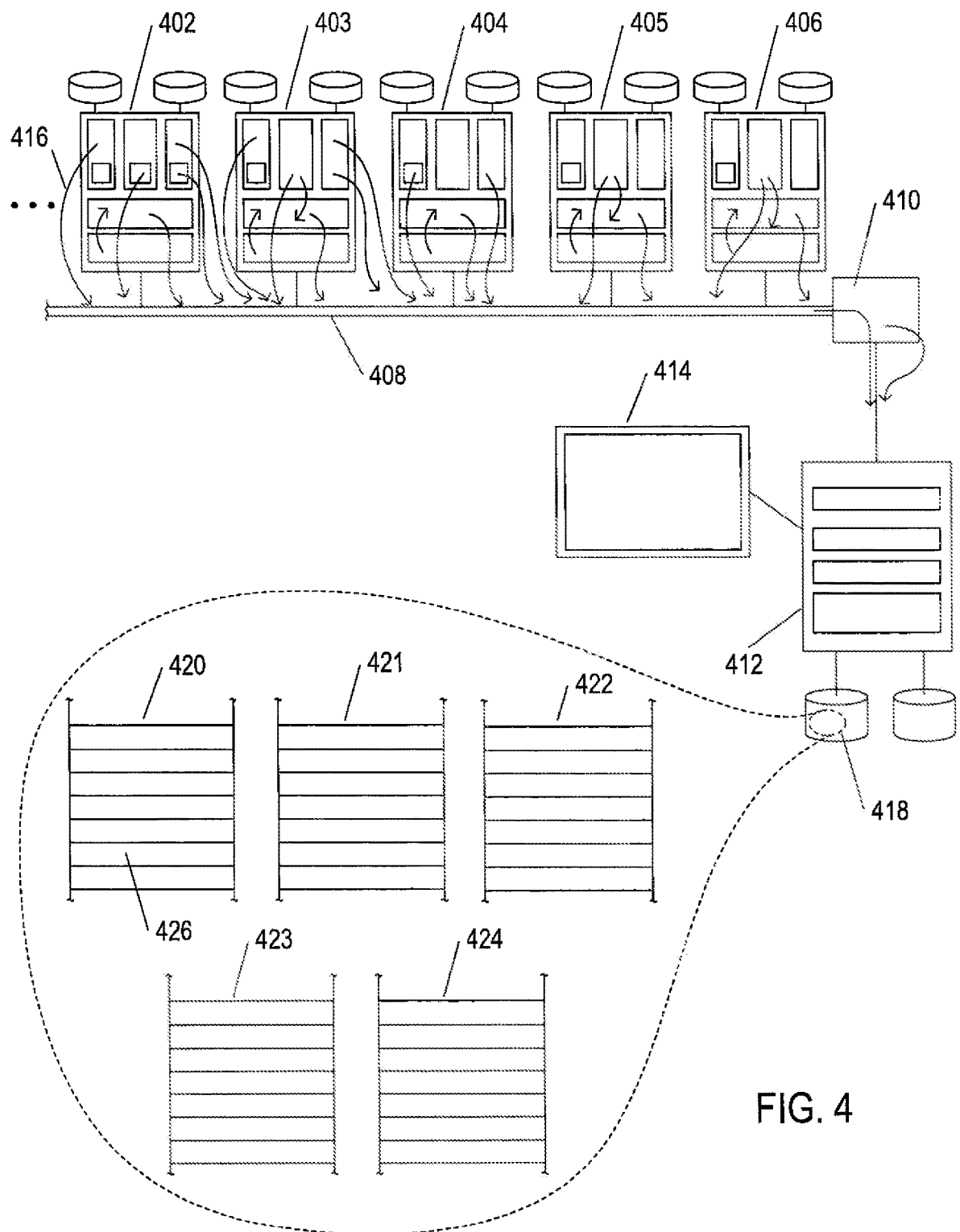
FIG. 4 shows an example of logging log messages in log files.

FIG. 4 shows an example of logging log messages in log files. In FIG. 4, computer systems 402-406 within a data center are linked together by an electronic communications medium 408 and additionally linked through a communications bridge/router 410 to an administration computer system 412 that includes an administrative console 414. Each of the computer systems 402-406 may run a log monitoring agent that forwards log messages to the operations manager 132 executing on the administration computer system 412. As indicated by curved arrows, such as curved arrow 416, multiple components within each of the computer systems 402-406 as well as the communications bridge/router 410 generate log messages that are forwarded to the administration computer system 412. Each log message records an event and is generated by any event source. Event sources may be, but are not limited to, programs, operating systems, VMs, guest operating systems, containers, network devices, machine codes, event channels, and other computer programs or processes running on the computer systems 402-406, the bridge/router 410 and any other components of a data center. Log messages may be received by log monitoring agents at various hierarchical levels within a computer system and then forwarded to the administration computer system 412. The operations manager 132 records the log messages in log files 420-424 of the log database 315 of a data-storage device or appliance 418. Rectangles, such as rectangle 426, represent individual log messages. For example, log file 420 may contain a list of log messages generated within the computer system 402. Each log monitoring agent has a configuration that includes a log path and a log parser. The log path specifies a unique file system path in terms of a directory tree hierarchy that identifies the storage location of a log file on the data-storage device 418. The log monitoring agent receives specific file and event channel log paths to monitor log files and the log parser includes log parsing rules to extract and format lines of the log message into log message fields described below.

Figure 5:
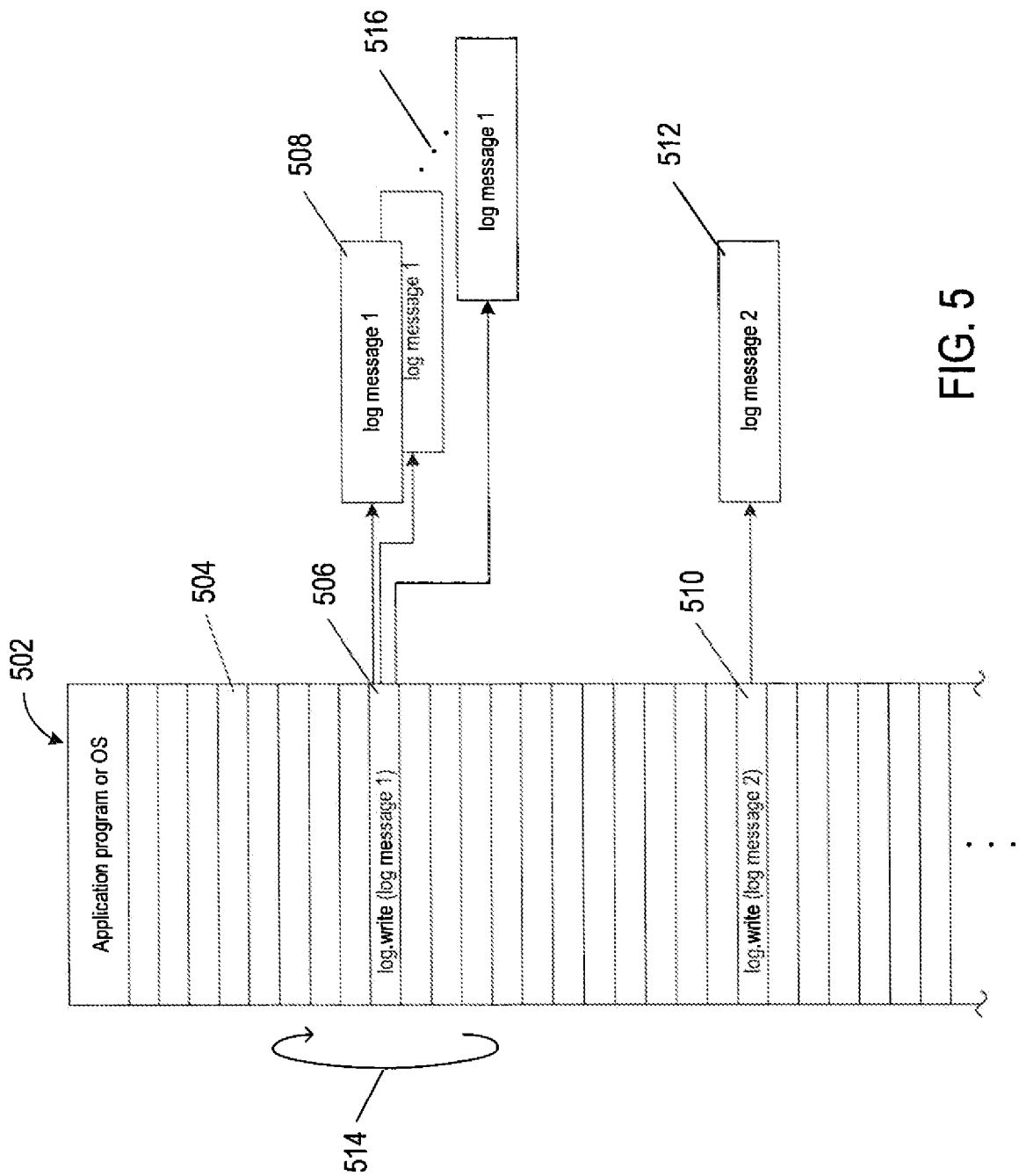
FIG. 5 shows an example source code of an event source.

FIG. 5 shows an example source code 502 of an event source. The event source can be an application, an operating system, a VM, a guest operating system, or any other computer program or machine code that generates log messages. The source code 502 is just one example of an event source that generates log messages. Rectangles, such as rectangle 504, represent a definition, a comment, a statement, or a computer instruction that expresses some action to be executed by a computer. The source code 502 includes log write instructions that generate log messages when certain events predetermined by a developer occur during execution of the source code 502. For example, source code 502 includes an example log write instruction 506 that when executed generates a "log message 1" represented by rectangle 508, and a second example log write instruction 510 that when executed generates "log message 2" represented by rectangle 512. In the example of FIG. 5, the log write instruction 508 is embedded within a set of computer instructions that are repeatedly executed in a loop 514. As shown in FIG. 5, the same log message 1 is repeatedly generated 516. The same type of log write instructions may also be located in different places throughout the source code, which in turns creates repeats of essentially the same type of log message in the log file.

In FIG. 5, the notation "log.write( )" is a general representation of a log write instruction. In practice, the form of the log write instruction varies for different programming languages. In general, the log write instructions are determined by the developer and are unstructured, or semistructured, and in many cases are relatively cryptic. For example, log write instructions may include instructions for time stamping the log message and contain a message comprising natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions are written in a source code by the developer of a program or operating system in order to record events that occur while an operating system or application program is executing. For example, a developer may include log write instructions that record informative events including, but are not limited to, identifying startups, shutdowns. I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 6 shows an example of a log write instruction 602. The log write instruction 602 includes arguments identified with "$" that are filled at the time the log message is created. For example, the log write instruction 602 includes a timestamp argument 604, a thread number argument 606, and an internet protocol ("IP") address argument 608. The example log write instruction 602 also includes text strings and natural-language words and phrases that identify the level of importance of the log message 610 and type of event that triggered the log write instruction, such as "Repair session" argument 612. The text strings between brackets "[ ]" represent file-system paths, such as path 614. When the log write instruction 602 is executed by a log management agent, parameters are assigned to the arguments and the text strings and natural-language words and phrases are stored as a log message of a log file.

FIG. 7 shows an example of a log message 702 generated by the log write instruction 602. The arguments of the log write instruction 602 may be assigned numerical parameters that are recorded in the log message 702 at the time the log message is executed by the log management agent. For example, the time stamp 604, thread 606, and IP address 608 arguments of the log write instruction 602 are assigned corresponding numerical parameters 704, 706, and 708 in the log message 702. Alphanumeric expression 1910 is assigned to a repair session argument 612. The time stamp 704 represents the date and time the log message 702 was generated. The text strings and natural-language words and phrases of the log write instruction 602 also appear unchanged in the log message 702 and may be used to identify the type of event (e.g., informative, warning, error, or fatal), also called an "event type," that occurred during execution of the event source.

Figure 8:
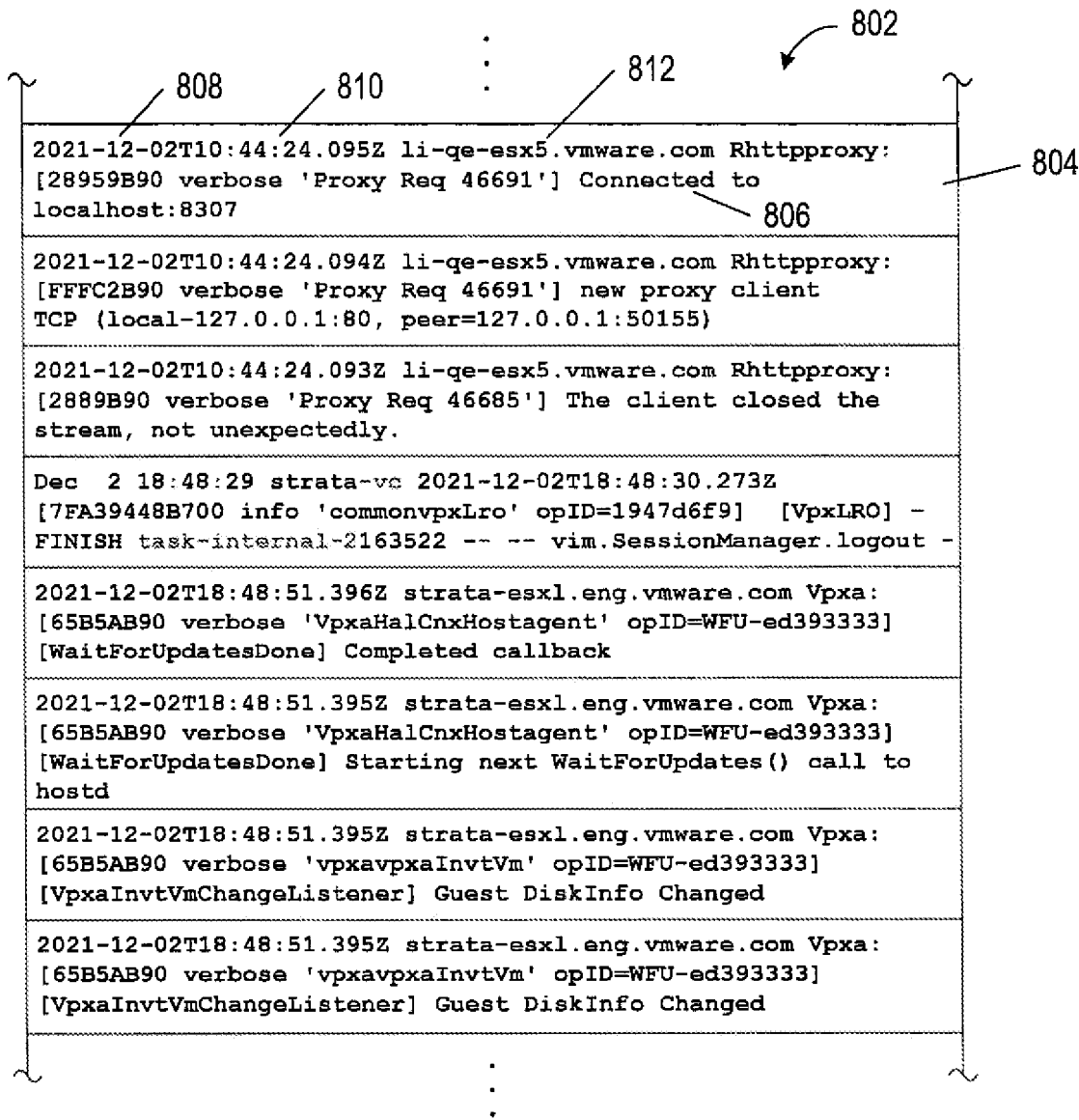
FIG. 8 shows a small, eight-entry portion of a log file.

As log messages are received from various event sources, the log messages are stored in corresponding log files of the log database 314 in the order in which the log messages are received. FIG. 8 shows a small, eight-entry portion of a log file 802. In FIG. 8, each rectangular cell, such as rectangular cell 804, of the log file 802 represents a single stored log message. For example, log message 804 includes a short natural-language phrase 806, date 808 and time 810 numerical parameters, and an alphanumeric parameter 812 that identifies a particular host computer.

Key Performance Indicators

The analytics engine 312 constructs certain key performance indicators ("KPIs") of application performance and stores the KPIs in the KPI database 316. An application can have numerous associated KPIs. Each KPI of an application measures a different feature of application performance and is used by the analytics engine 312 to detect particular performance problems. A KPI is a metric that can be constructed from other metrics and is used as a indicator of the health of an application executing in the data center. A KPI is denoted by $$(y_m)_{m=1}^{M} = (y(t_m))_{m=1}^{M} \quad (1)$$

where
$t_m$ is a time stamp:
$y_m = y(t_m)$ is a metric value; and
M is the number of KPI values recorded over a time period.

A distributed resource scheduling ("DRS") score is an example of a KPI that is constructed from other metrics and is used to measure the performance level of a VM, container, or components of a distributed application. The DRS score is a measure of efficient use of resources (e.g., CPU memory, and network) by an object and is computed as a product of efficiencies as follows:

$$y(t_m) = EFFCY_{CPU}(t_m) \times EFFCY_{Mem}(t_m) \times EFFCY_{Net}(t_m) \quad (2)$$

where $$EFFCY_{CPU}(t_m) = \frac{CPU\ usage\ (t_m)}{Ideal\ CPU\ usage};$$

$$EFFCY_{Mem}(t_m) = \frac{Memory\ usage\ (t_m)}{Ideal\ Memory\ usage}; and$$

$$EFFCY_{Net}(t_m) = \frac{Network\ throughput\ (t_m)}{Ideal\ Network\ throughput}$$

The metrics CPU usage ($t_m$), Memory usage($t_m$), and Network throughput($t_m$) of an object are measured at points in time as described above with reference to Equation (2). Ideal CPU usage. Ideal Memory usage, and Ideal Network throughput are preset. For example. Ideal CPU usage may be preset to 30% of the CPU and Ideal Memory usage may be preset to 40% of the memory. DRS scores can be used for, example, as a KPI that measures the overall health of a distributed application by aggregating, or averaging, the DRS scores of each VM that executes a component of the distributed application.

Other examples of KPIs for an application include average response times to client request, error rates, contention time for resources, or a peak response time. Other types of KPIs can be used to measure the performance level of a cloud application. A cloud application is a distributed application with data storage and logical components of the application executed in a data center and local components provide access to the application over the internet via a web browser or a mobile application on a mobile device. For example, a KPI for an online shopping application could be the number of shopping carts successfully closed per unit time. A KPI for a website may be response times to customer requests. KPIs may also include latency in data transfer, throughput, number of packets dropped per unit time, or number of packets transmitted per unit time.

The analytics engine 312 detects performance problems by comparing a values of a KPI to a corresponding KPI threshold, denoted by $Th_{KPI}$. The corresponding KPI threshold $Th_{KPI}$, can be a dynamic threshold that is automatically adjusted by the analytics engine 312 to changes in the application behavior over time or the threshold can be a fix threshold. When one or more metric values of the KPI violate the threshold, such as $y_i > Th_{KPI}$ for an upper threshold, or $y_i < Th_{KPI}$ for a lower threshold, the application is exhibiting a performance problem, the analytics engine 312 can generate an alert and the alert can be displayed in the user interface 302.

Event Type

The event type engine 306 extracts parametric and non-parametric strings of characters called tokens from log messages using regular expressions. A regular expression, also called "regex." is a sequence of symbols that defines a search pattern in text data. Many regex symbols match letters and numbers. For example, the regex symbol "a" matches the letter "a," but not the letter "b," and the regex symbol "100" matches the number "100." but not the number 101. The regex symbol "." matches any character. For example, the regex symbol ".art" matches the words "dart," "cart," and "tart," but does not match the words "art," "hurt," and "dark," A regex followed by an asterisk "*" matches zero or more occurrences of the regex. A regex followed by a plus sign "+" matches one or more occurrences of a one-character regex. A regular expression followed by a questions mark "T" matches zero or one occurrence of a one-character regex. For example, the regex "a*b" matches b, ab, and aaab but does not match "baa." The regex "a+b" matches ab and aaab but does not match b or baa. Other regex symbols include a "\d" that matches a digit in 0123456789, a "\s" matches a white space, and a "\b" matches a word boundary. A string of characters enclosed by square brackets, [ ], matches any one character in that string. A minus sign "-" within square brackets indicates a range of consecutive ASCII characters. For example, the regex [aeiou] matches any vowel, the regex [a-f] matches a letter in the letters abcdef, the regex [0-9] matches a 0123456789, the regex [_%+-] matches any one of the characters._%+-. The regex [0-9a-f] matches a number in 0123456789 and a single letter in abcdef. For example, [0-9a-f] matches a6, i5, and u2 but does not match ex. 9v, or %6. Regular expressions separated a vertical bar "|" represent an alternative to match the regex on either side of the bar. For example, the regular expression Get|GetValue|Set|SetValue matches any one of the words: Get, GetValue, Set, or SetValue. The braces "{ }" following square brackets may be used to match more than one character enclosed by the square brackets. For example, the regex [0-9]{2} matches two-digit numbers, such as 14 and 73 but not 043 and 4, and the regex [0-9](1-2) matches any number between 0 and 99, such as 3 and 58 but not 349.

Figure 9A:
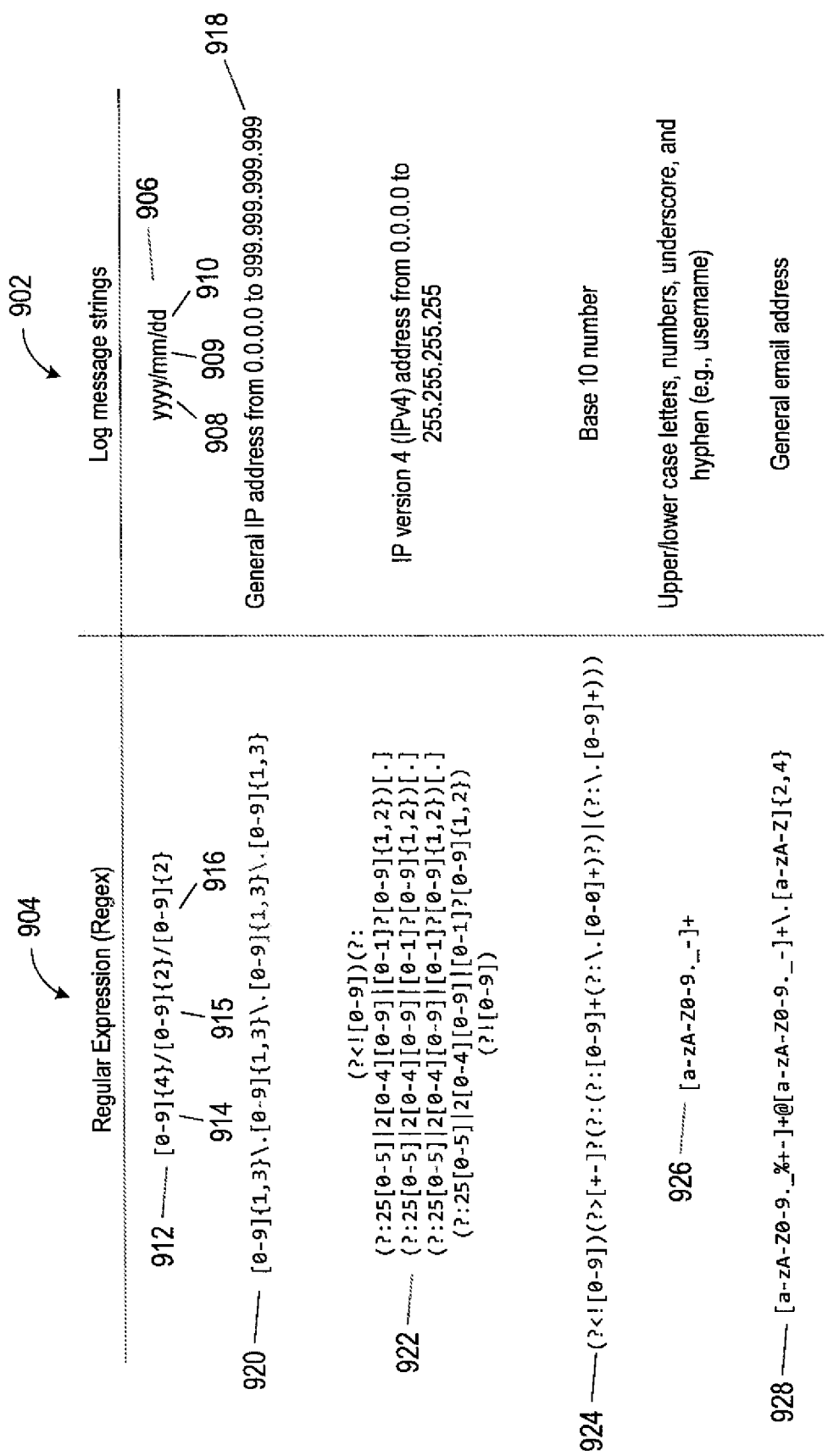
FIG. 9A shown a table of examples of regular expressions designed to match particular character strings of log messages.

Simple regular expressions are combined to form larger regular expressions that match character strings of log messages and can be used to extract the character strings from the log messages. FIG. 9A shown a table of examples of regular expressions designed to match particular character strings of log messages. Column 902 list six different types of strings that may be found in log messages. Column 904 list six regular expressions that match the character strings listed in column 902. For example, an entry 906 of column 902 represents a format for a date used in the time stamp of many types of log messages. The date is represented with a four-digit year 908, a two-digit month 909, and a two-digit day 910 separated by slashes. The regex 912 includes regular expressions 914-916 separated by slashes. The regular expressions 914-916 match the characters used to represent the year 908, month 909, and day 910. Entry 918 of column 902 represents a general format for internet protocol ("IP") addresses. A typical general IP address comprises four numbers. Each number ranges from 0 to 999 and each pair of numbers is separated by a period, such as 27.0.15.123. Regex 920 in column 904 matches a general IP address. The regex [0-9]{1-3} matches a number between 0 and 900. The backslash "\" before each period indicates the period is part of the IP address and is different from the regex symbol "." used to represent any character. Regex 922 matches any IPv4 address. Regex 924 matches any base-10 number. Regex 926 matches one or more occurrences of a lower-case letter, an upper-case letter, a number between 0 and 9, a period, an underscore, and a hyphen in a character string. Regex 928 matches email addresses. Regex 928 includes the regex 926 after the ampersand symbol.

In another implementation, the event-type engine 306 extracts non-parametric tokens from log messages using Grok expressions. Grok patterns are predefined symbolic representations of regular expressions that reduce the complexity of constructing regular expressions. Grok patterns are categorized as either primary Grok patterns or composite Grok patterns that are formed from primary Grok patterns. A Grok pattern is called and executed using the notation Grok syntax % (Grok pattern).

FIG. 9B shows a table of examples of primary Grok patterns and corresponding regular expressions. Column 932 contains a list of primary Grok patterns. Column 934 contains a list of regular expressions represented by the Grok patterns in column 932. For example, the Grok pattern "USERNAME" 936 represents the regex 938 that matches one or more occurrences of a lower-case letter, an upper-case letter, a number between 0 and 9, a period, an underscore, and a hyphen in a character string. Grok pattern "HOSTNAME" 940 represents the regex 942 that matches a hostname. A hostname comprises a sequence of labels that are concatenated with periods. Note that the list of primary Grok patterns shown in FIG. 9 is not an exhaustive list of primary Grok patterns.

Grok patterns may be used to map specific character strings into dedicated variable identifiers. Grok syntax for using a Grok pattern to map a character string to a variable identifier is given by:

%{GROK_PATTERN:variable_name} where
  GROK_PATTERN represents a primary or a composite Grok pattern; and
  variable_name is a variable identifier assigned to a character string in text data that matches the GROK_PATTERN.

A Grok expression is a parsing expression that is constructed from Grok patterns that match characters strings in text data and may be used to parse character strings of a log message. Consider, for example, the following simple example segment of a log message:

34.5.243.1 GET index.html 14763 0.064

A Grok expression that may be used to parse the example segment is given by:

%{IP:ip_address}\s %{WORD:word}\s %{URIPATH-PARAM:request}\s
%{INT:bytes}\s %{NUMBER:duration}$ The hat symbol "^" identifies the beginning of a Grok expression. The dollar sign symbol "$" identifies the end of a Grok expression. The symbol "\s" matches spaces between character strings in the example segment. The Grok expression parses the example segment by assigning the character strings of the log message to the variable identifiers of the Grok expression as follows:

ip_address: 34.5.243.1
word: GET
request: index.html
bytes: 14763
duration: 0.064

Different types of regular expressions or Grok expressions are configured to match token patterns of log messages and extract tokens from the log messages. Numerous log messages may have different parametric tokens but the same set of non-parametric tokens. The non-parametric tokens extracted from a log message describe the type of event, or event type, recorded in the log message. The event type of a log message is denoted by $E_i$, where subscript i is an index that distinguishes the different event types of log messages. Many event types correspond to benign events recorded in log message while event types that describe errors, warning or critical problems are identified by the operation management server 132.

FIG. 9C shows an example of a Grok expression 944 used to extract tokens from a log message 946. Dashed directional arrows represent parsing the log message 946 such that tokens that correspond to Grok patterns of the Grok expression 944 are assigned to corresponding variable identifiers. For example, dashed directional arrow 948 represents assigning the time stamp 2021-07-18T06:32:07+00:00 950 to the variable identifier timestamp_iso8601 952 and dashed directional arrow 954 represents assigning HTTP response code 200 956 to the variable identifier response_code 958. FIG. 9C shows assignments of tokens of the log message 946 to variable identifiers of the Grok expression 944. The combination of non-parametric tokens 960-962 identify the event type 964 of the log message 946. Parametric tokens 966-968 may change for different log messages with the same event type 964.

Automated Methods and System for Resolving Performance Problems with Applications Executing in a Data Center A KPI reveals abnormal behavior of an application. One the other hand, log messages can provide contextual information about the abnormal behavior discovered with the KPI. The analytics engine 312 uses machine learning as described below to train a model that contains specific rules relating events recorded in log messages to KPI values of the KPI recorded in a historical time period. These rules are used by the analytics engine 312 to determine which events recorded in run-time log messages identify a probable root cause of a performance problem revealed by the KPI.

FIG. 10A shows an example plot of a KPI associated with an object executing in a data center. In the following discussion, the object can be an application, component of a distributed application, a VM, a container, computer hardware, such as a host or switch. The analytics engine 312 measures the KPI in monitoring intervals and stores the KPI values in the metrics database 316. Horizontal line 1002 represents a time axis of a historical time period. Vertical axis 1004 represents a range of KPI values. The time axis 1002 is partitioned into nine shorter time periods. Each shorter time period may represent one day, 12 hours, 8 hours, or 1 hour. Solid dots represent KPI values produced at the end of regularly spaced time intervals of the shorter time periods. Solid dots 1006 represents KPI value $y_m$, and solid dot 1008 represents KPI value $y_{m+1}$. Suppose the time period 1010 represents one day and the KPI is the response time of an application to customer requests. Suppose the KPI values, such as KPI values $y_m$ 1006 and $y_{m+1}$ 1008, represent the average response time of the website measured in three-hour time intervals. KPI value $y_{m+1}$ 1008 indicates a spike, or significant increase, in response times to customer requests in the time interval 1012, which may be an indication of degradation of the object. The KPI indicates abnormal behavior, but the KPI does not reveal the cause of the behavior.

The analytics engine 312 determines which KPI values in the historical time period are outliers. An outlier KPI value is an indication of abnormal behavior of an object. KPI values are label with tags that distinguishes outlier KPI values from normal KPI values. For example, in the follow discussion, the outlier KPI values are tagged with binary value "1" and normal KPI value are labeled with binary value "0."

A KPI threshold, $Th_{KPI}$, can be used to detect outlier KPI values. For example, a data center tenant may not want response times to customer requests to exceed 1 minute. In this example, the KPI threshold is set to 1 minute. Alternatively, the KPI threshold may be a percentile. For example, KPI values in the 99$^{th}$ percentile of the KPI values recorded over the historical time period, such as a week or two weeks, are outliers. In another implementation, the analytic engine 312 partitions the KPI values recorded over the period of time into quartiles, where $Q_2$ denotes the median of KPI values, $Q_1$ denotes a lower median of the KPI values that are less than the median $Q_2$, and $Q_3$ denotes an upper median of the KPI values that are greater than the median $Q_2$. Fifty percent of the KPI values lie in the interquartile range:

$$IQR = Q_3 - Q_1 \qquad (3)$$

The analytics engine 312 computes a whisker minimum given by $$\text{Min} = Q_1 - B \times IQR \qquad (4a)$$

and computers a whisker maximum given by $$\text{Max} = Q_3 + B \times IQR \qquad (4b)$$

where B is a constant greater than 1 (e.g., B=1.5). The whisker minimum and whisker maximum are used to evaluate KPI values. KPI values that are less that the whisker minimum are outliers and KPI values that are greater that the whisker maximum are outliers. The analytics engine 312 applies a first KPI label to KPI values that are an indication of abnormal behavior (i.e., outliers) and applies a second KPI label to KPI values that are not an indication of abnormal behavior (i.e., normal).

FIG. 10B shows a plot of the KPI values in FIG. 10A with a threshold 1014 that separates outlier KPI values from normal KPI values. KPI values 1008, 1016, and 1018 are greater than the threshold 1014 and are tagged with a KPI label given by binary value 1. KPI values, such as values 1008, 1018, and 1020, that are less than the KPI threshold are tagged with a KPI label given by binary value 0.

The analytics engine 312 computes a probability distribution of event types of log messages produced in the time intervals between consecutive KPI values. Let N be the total number of event types that can be extracted from log messages generated by event sources associated with the object. The event type engine 306 determines the event type of each log message produced in the m-th time interval that precedes the m-th KPI value. The analytics engine 312 computes the number of times each event type appeared in the time interval. Let $n(et_{mn})$ denote an event type counter of the number of times the event type $et_{mn}$ occurred in the time interval, where n=1, . . . , N. Note that certain event types may not occur in a given time interval. In these cases, $n(et_{mn})=0$. The analytics engine 312 computes an event type probability for each of the N event types:

$$p_{mn} = \frac{n(et_{mn})}{N} \quad (5)$$

The analytics engine 312 forms an event type probability distribution from event type probabilities the n-th time interval:

$$P_m = (p_{m1}, p_{m2}, \ldots, p_{m,N-1}, p_{mN}) \quad (6)$$

where m=1, . . . , M.

The probability distribution in Equation (6) contains an event type probability for each of the N events that may occur in the m-th time interval. As a result, a number of the probabilities in the probability distribution (6) may be equal to zero. The analytics engine 312 assigns the binary value of the KPI value to the corresponding probability distribution of the time interval and stores the probability distribution and the binary value ($P_m$, b), where b equals 0 or 1, in a data frame of a.

Figure 11:
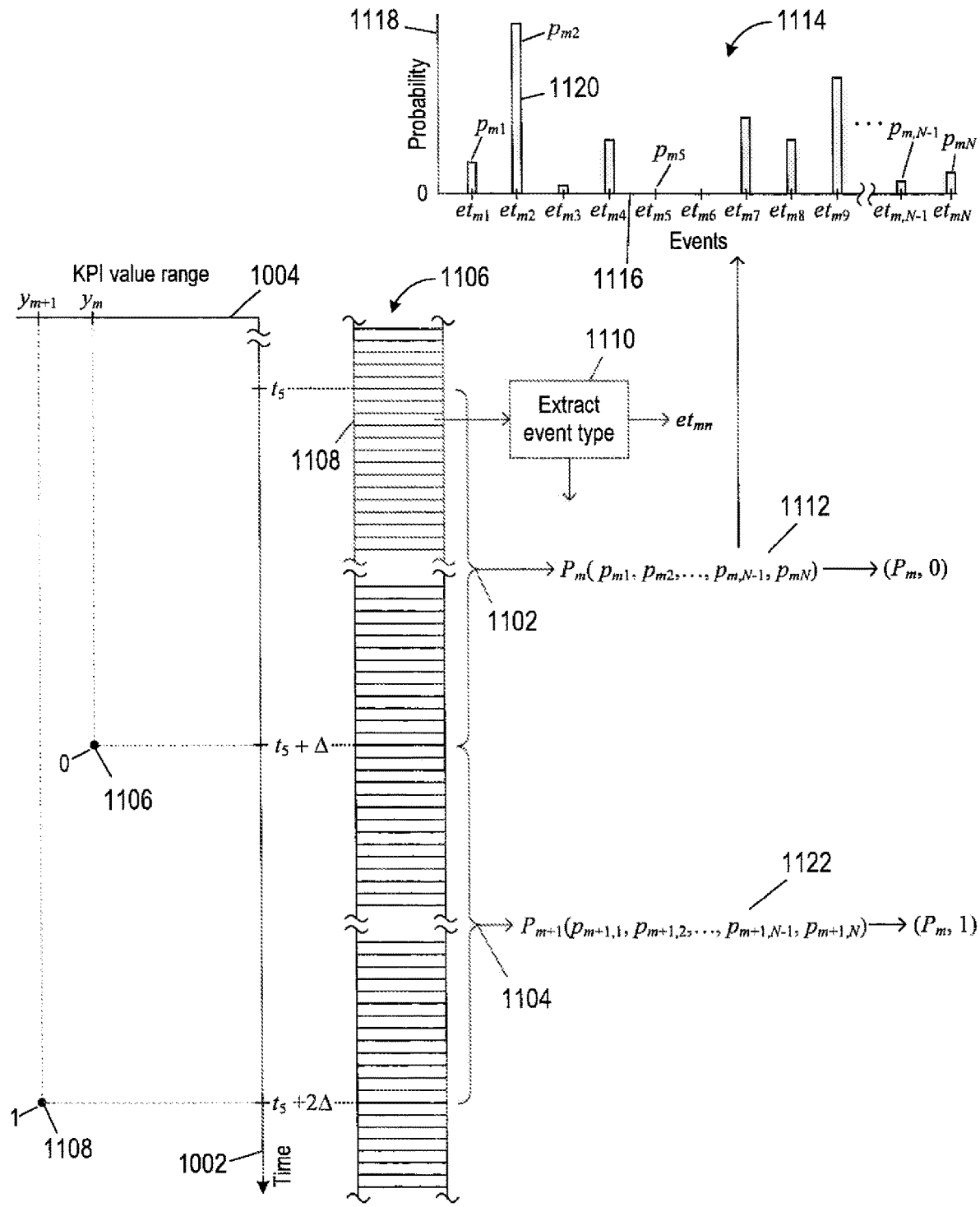
FIG. 11 shows construction of example event-type probability distributions.

FIG. 11 shows construction of example event-type probability distributions for two consecutive time intervals. FIG. 11 shows a portion of the time axis 1002 and the KPI values 1006 and 1008 shown in FIGS. 10A-10B. The duration of the time intervals between KPI values is denoted by $\Delta$. The time interval 1102 that precedes the KPI value 1006 is denoted by $[t_5, t_5+\Delta)$. The time interval 1104 that precedes the KPI value 1008 is denoted by $[t_5+\Delta, t_5+2\Delta)$. FIG. 11 also shows a portion of a log file 1106 that contains log messages with time stamps in the interval $[t_5, t_5+2\Delta)$. Each log message in the log file 1106 is represented by a rectangle. For example, rectangle 1108 represents a log message with a time stamp in the time interval $[t_5, t_5+\Delta)$ 1102. Block 1110 represents extraction of event types from a log message 1108 to obtain event type $et_{mn}$ by the even type engine 306 described above. The event type engine 306 extracts the event type from each of the log messages. The analytics engine 312 computes a probability distribution from the event types extracted in the time intervals as described above with reference to Equations (5) and (6). Probability distribution 1112 represents the probabilities of the event t) pes in the time interval 1102. FIG. 11 shows an example plot 1114 of the probabilities of the probability distribution 1112. Horizontal line 1116 represents the range of event types. Vertical line 1118 represents the range of probabilities. Bars represent the probabilities of different event types. For example, bar 1120 represents the value of the probability $p_{m2}$ of the event type $et_{m2}$ occurring in the time interval 1102. The probability distribution 1112 includes zero probabilities that correspond to event types that did not occur in the time interval 1102. For example, the probability $p_{m5}$ of the event type $et_{m5}$ is zero because log messages with the event type $et_{m5}$ were not generated in the time interval 1102. Probability distribution 1122 represents the probabilities of the event types of log messages recorded in the time interval 1102.

The probability distributions are assigned the KPI label assigned to the corresponding KPI value. For example, the outlier status value "0" of the KPI value $y_m$ 1106 is assigned to the probability distribution $P_m$ 1112. The probability distribution $P_m$ 1112 and corresponding outlier status label "0" are denoted by ($P_m$, 0). The outlier status value "1" of the KPI value $y_{m+1}$ 1108 is assigned to the probability distribution $P_{m+1}$ 1122. The probability distribution $P_{m+1}$ 1122 and corresponding outlier status label "1" are denoted by ($P_{m+1}$, 1).

Figure 12:
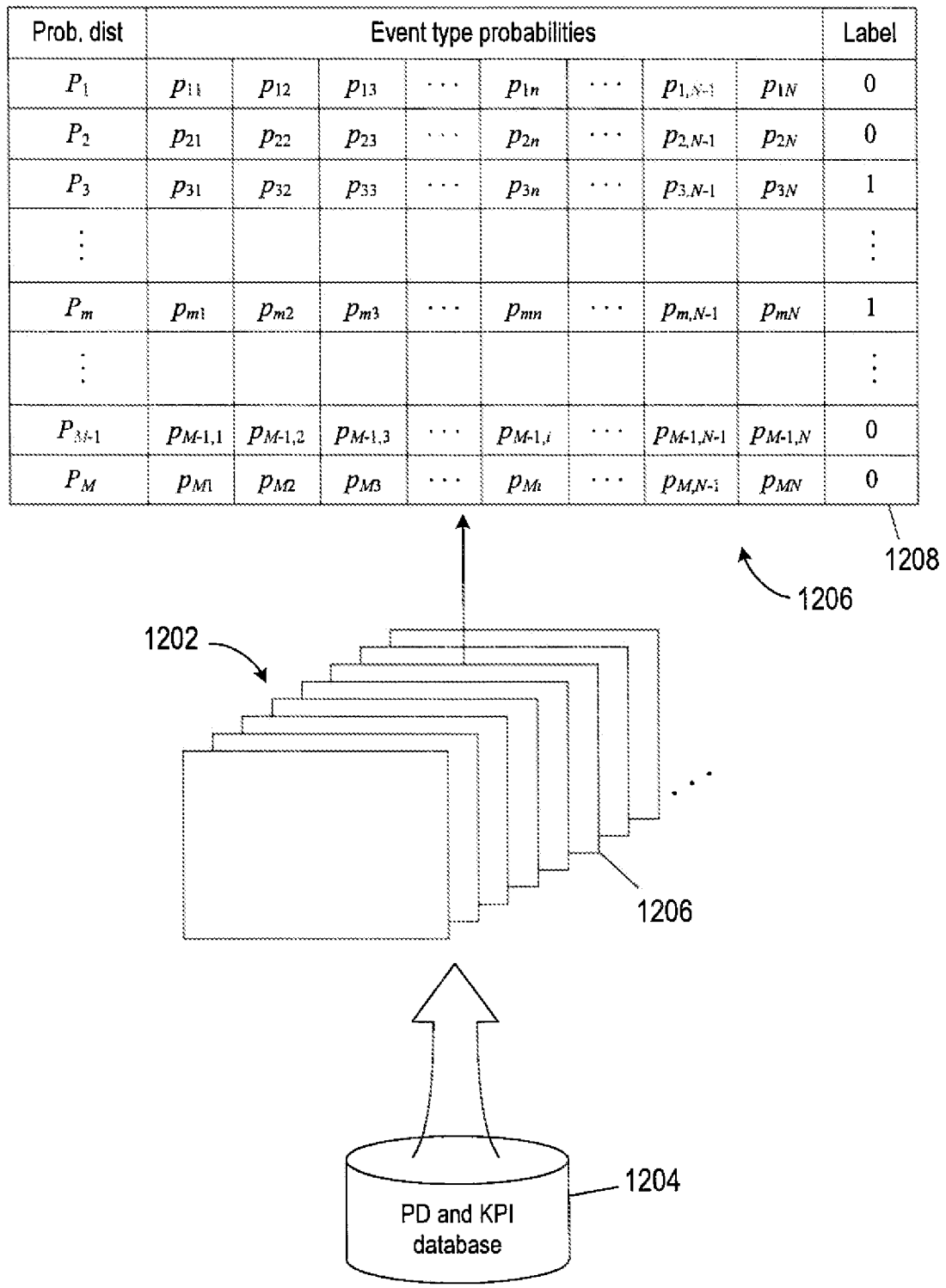
FIG. 12 shows an example data frame of probability distributions and KPI labels.

The analytics engine 312 stores the probability distributions and corresponding outlier status labels of each KPI in a data frame of a probability distributions and KPI database. FIG. 12 shows an example data frame 1202 of probability distributions and KPI labels. The data frame 1202 is persisted in a probability distributions and KPI database 1204. Probability distributions and KPI labels of different KPIs are stored in separate data frames. FIG. 12 also shows an enlargement of a data frame 1204 that records M event-type probability distributions and corresponding KPI labels of KPI values. Column 1208 records the KPI labels of the KPI values. Each column contains the event type probabilities of a particular event type $et_n$. Each row contains the event type probabilities of a probability distribution associated with one of the KPI labels.

A typical data frame contains a large number of probability distributions and each distribution contains a large number of probabilities. Data frames may also contain a large number of redundant information. The analytics engine 312 uses the method of random forests to measure the importance of event types and exclude redundant information prior to training a model using machine learning. The random forest method receives as input the probability distributions and associated KPI labels ($P_1$, b), . . . , ($P_M$, b). The analytics engine 312 performs hyper-parameter tuning via 5-fold cross validation with 'roc . . . auc' scoring which returns the optimal set of values for the number of estimators, maximum depth of trees and the number of maximum event types of the probability distributions. The analytics engine 312 balances the classes by using weights inversely proportional to class frequencies in the input data. This process is iterated by removing event types with zero importance and retraining the model until the final model includes only important event types with positive importance scores. The method of random forests and estimation of the importance-scores using permutation feature importance for removing the possible bias is described in the reference "Random forest," by L. Breiman, *Machine Learning* 45(1) 5-32 (2001), which is herein incorporated by reference. The random forest approach is a model inspection method that estimates a decrease of a model score when a single event type is randomly shuffled. A decrease in the model score is indicative of how much the model depends on an event type.

Figure 13:
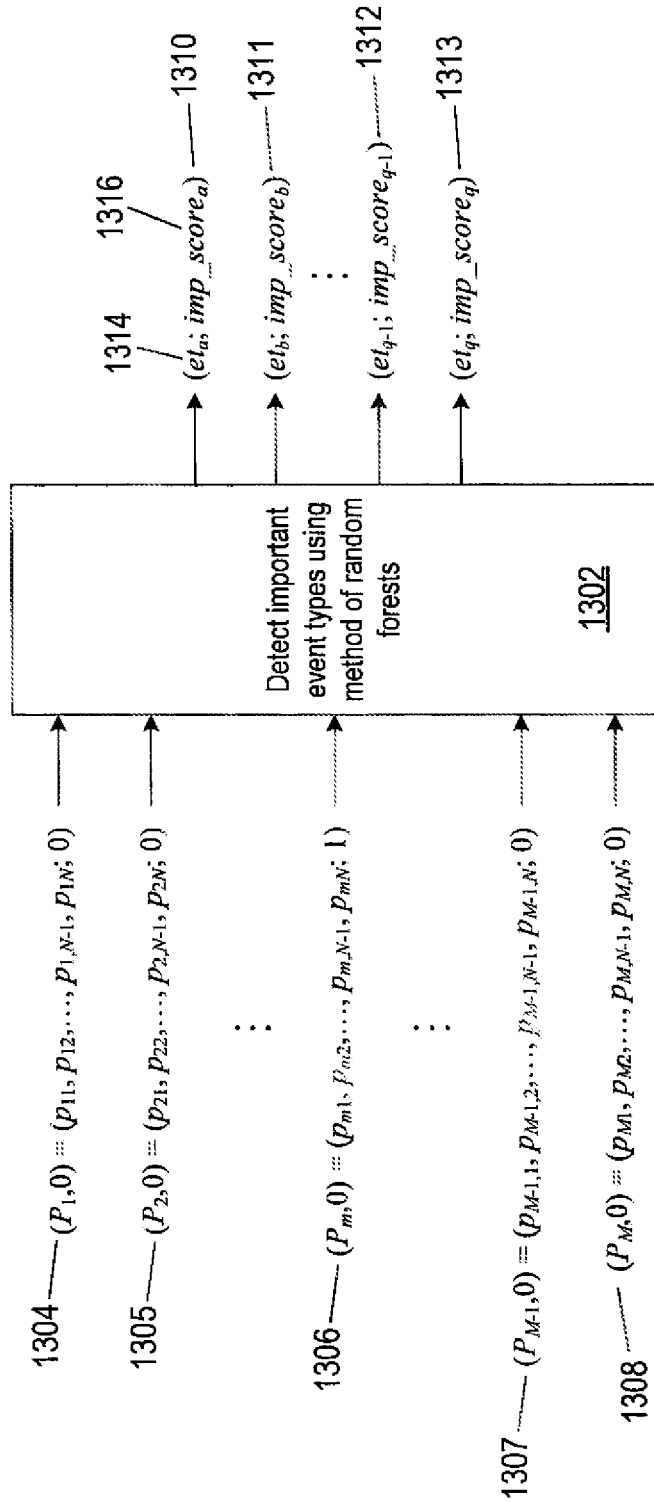
FIG. 13 shows an example of detecting important event types based on probability distributions and KPI labels of the data frame.

FIG. 13 shows an example of detecting important event types based on probability distributions and KPI labels of the data frame 1206. Block 1302 represents the random forests process of detecting important event types. The random forests process 1302 receives as input the probability distributions and associated KPI labels of the data frame 1206, which includes the probability distributions and associated KPI labels 1304-1308. The random forest process 1302 outputs import event types and corresponding importance scores. For example, event type $et_a$ 1314 has a corresponding importance score 1316. The important event types output from the random forests process 1302 are denoted by $$(et_a, et_b, \ldots, et_{q-1}, et_q) \qquad (7)$$

where q<N.
Each important event type has M corresponding probabilities in the probability distributions input to the random forest process 1302. For example, important event $et_a$ 1314 has an event type probability in each of the probability distributions $P_1, \ldots, P_M$. The corresponding importance scores in FIG. 13 are not necessarily an indicator of which important event types correspond to performance problems. The important event types are used to reduce the probability distributions to event type probabilities of the important event types output from the random forests process 1302. For example, the probability distribution of the N event type probabilities in Equation (6) is reduced to the event type probabilities of the important event types as follows:

$$P_m^{imp} = (p_{ma}, p_{mb}, \ldots, p_{m,q-1}, p_{mq}) \qquad (8)$$

where superscript "imp" denotes important event type probability distribution.

The analytics engine 312 uses machine learning to train a decision-tree model for constructing rules that identify one or more event types that describe the probably root cause of a run-time performance problem with an object executing in a data center. The decision-tree model is trained using the important event type probability distributions and KPI labels. Techniques for training a decision-tree model and obtaining rules for determining the rules include repeated incremental pruning to produce error reduction ("RIPPER") rule learning as described in "Fast effective rule induction," by W. Cohen, Proc. Twelfth International Conference on Machine Learning, Tahoe City. California, July 9-12. pp. 115-123, 1995, which is herein incorporated by reference. In another implementation, CN2 rule learning can be used to construct rule as describe in Foundation of Rule Learning, by J. Fürnkran, D. Gamberger, N Lavrac. Springer-Verlag, 2012, which is herein incorporated by reference.

Figure 14:
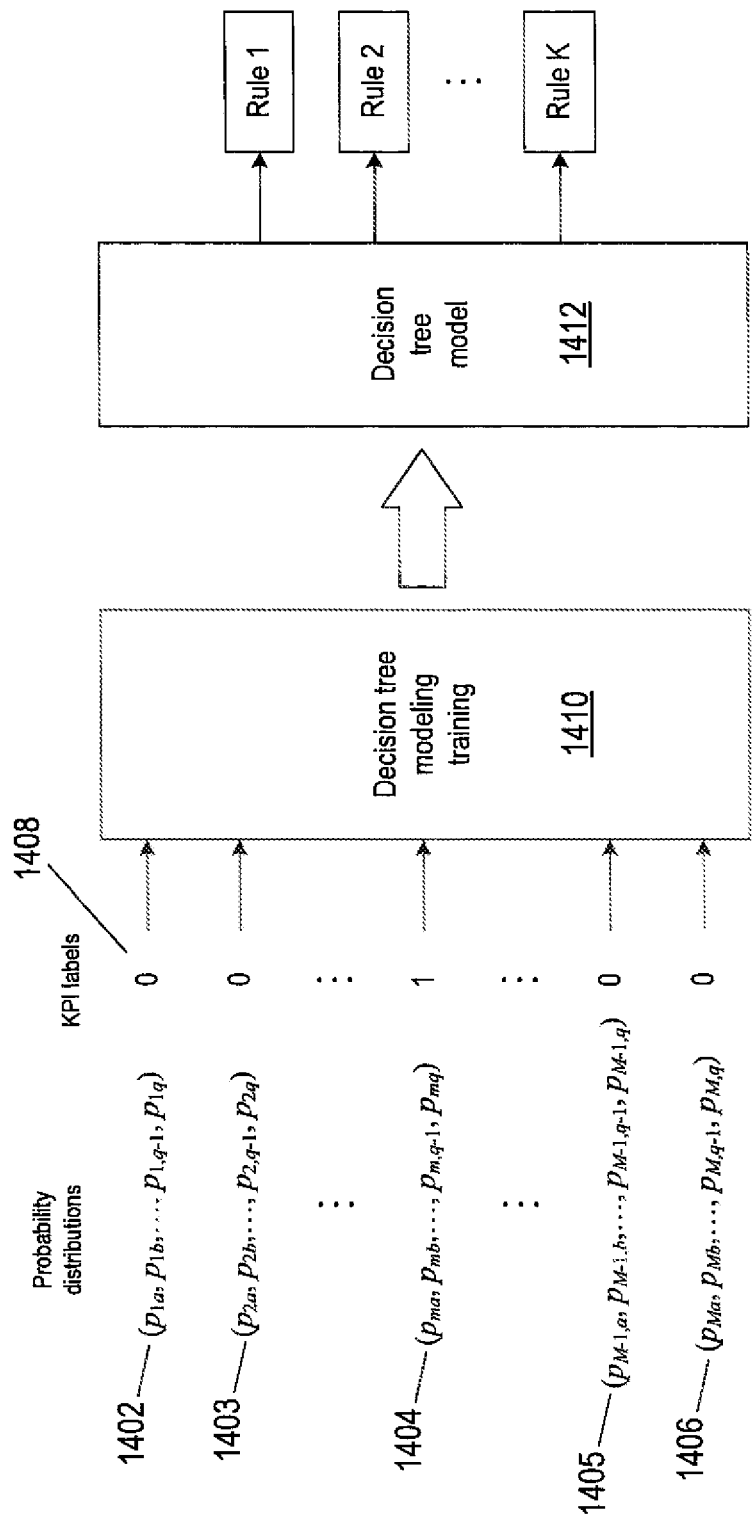
FIG. 14 shows an example of a decision tree technique used to generate a decision-tree model based on the set of important event type probability distributions and associated KPI labels.

FIG. 14 shows an example of a decision tree technique used to generate a decision-tree model based on the set of important event type probability distributions $\{P_m^{imp}\}_{m=1}^M$ and associated KPI labels. The important event type probability distributions $\{P_m^{imp}\}_{m=1}^M$ are represented by a data sets 1402-1406. A column 1408 of 0's and 1's list the KPI labels that correspond to the important event type probability distributions. Block 1410 represents the computational operations carried out by one of the decision tree techniques. As shown in FIG. 14, the probability distributions and corresponding KPI labels are input to the decision tree technique 1410 to train a decision-tree model 1412. The decision-tree model 1412 provides a set of rules, identified as Rule1, Rule2, . . . , RuleK for identifying event types that described the probable root cause of a performance problem.

For the sake of simplicity, the decision-tree model 1412 is represented as a graph in which each node denotes a test of one or more important event type probabilities. Each branch of the trained decision tree represents an outcome of a test (e.g., a test threshold value) in with an event type probability is compared to a threshold. The threshold values are determined in the decision-tree learning process. Each leaf corresponds to a KPI label. The root node is a test of one or more important event type probabilities that best classifies the event type probabilities. Paths through the decision-tree model reveal the rules that are used to identify event types associated with the probable root causes of a performance problem.

Figure 15:
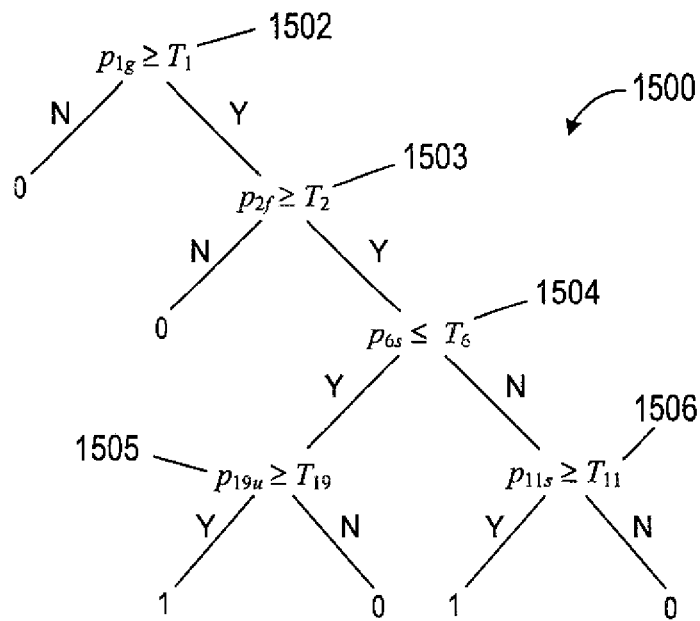
FIG. 15 show an example portion of a decision-tree model obtained from a decision tree technique.

FIG. 15 show an example portion of a decision-tree model 1500 obtained from a decision tree technique. For the sake of simplicity, only five different important event type probabilities denoted by $p_{1g}$, $p_{2f}$ $p_{6s}$, $p_{11s}$, and $p_{19}$ are used to create rules. The root node can be a test for an important event type probability with the largest entropy. At root node 1502, when the important event type probability is greater than threshold $T_1$, the KPI label is 0 and the object is behaving normally.

Figure 16:
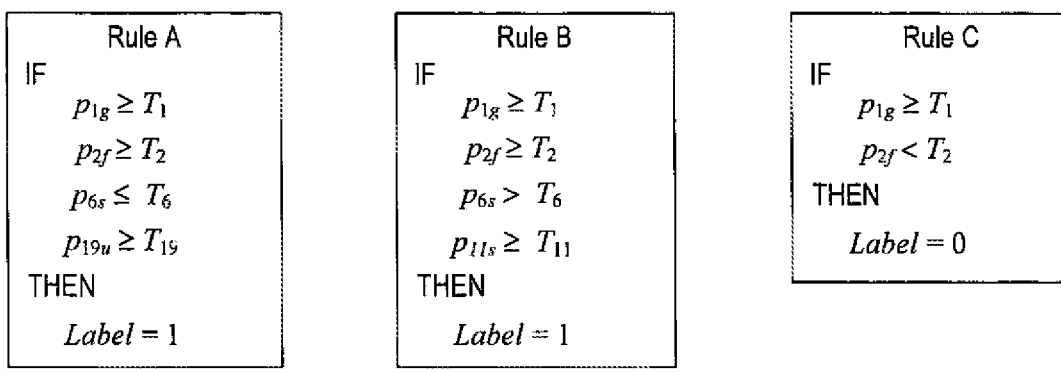
FIG. 16 shows three examples of rules obtained from the decision-tree model in FIG. 15.

FIG. 16 shows three examples of rules obtained from the decision-tree model 1500. Nodes 1502-1505 correspond to a path through the decision-tree model 1500 that leads a KPI value 1. The inequalities at the nodes 1502-1505 form a Rule A where if important event type probabilities $p_{1g}$, $p_{2f}$ $p_{6s}$, $p_{11s}$, and $p_{19}$ satisfy the corresponding conditional statements $p_{1g} \geq T_1$, $p_{2f} \leq T_2$, $p_{6s} \leq T_6$, and $p_{19u} \geq T_{19}$ then KPI label equals 1. The inequalities at the nodes 1502-1504, and 1506 form a Rule B where if important event type probabilities $p_{1g}$, $p_{2f}$ $p_{6s}$, and $p_{11s}$ satisfy the corresponding conditional statements $p_{1g} \geq T_1$, $p_{2f} \geq T_2$, $p_{6s} > T_6$, and $p_{11} \geq T_{11}$ then KPI label equals 1. The inequalities at the nodes 1502 and 1503 form a Rule C where if important event type probabilities $p_{1g}$ and $p_{2f}$ satisfy the corresponding conditional statements $p_{1g} \geq T_1$ and $p_{2f} < T_2$ then KPI label equals 0.

The conditional statements of the rules are used to detect the important event type probabilities that correspond to run-time KPI threshold violations. The important event types of log messages generated in a run-time time interval of a run-time KPI violation are extracted. The log messages describe the probable root cause of the KPI threshold violation.

Figure 17A:
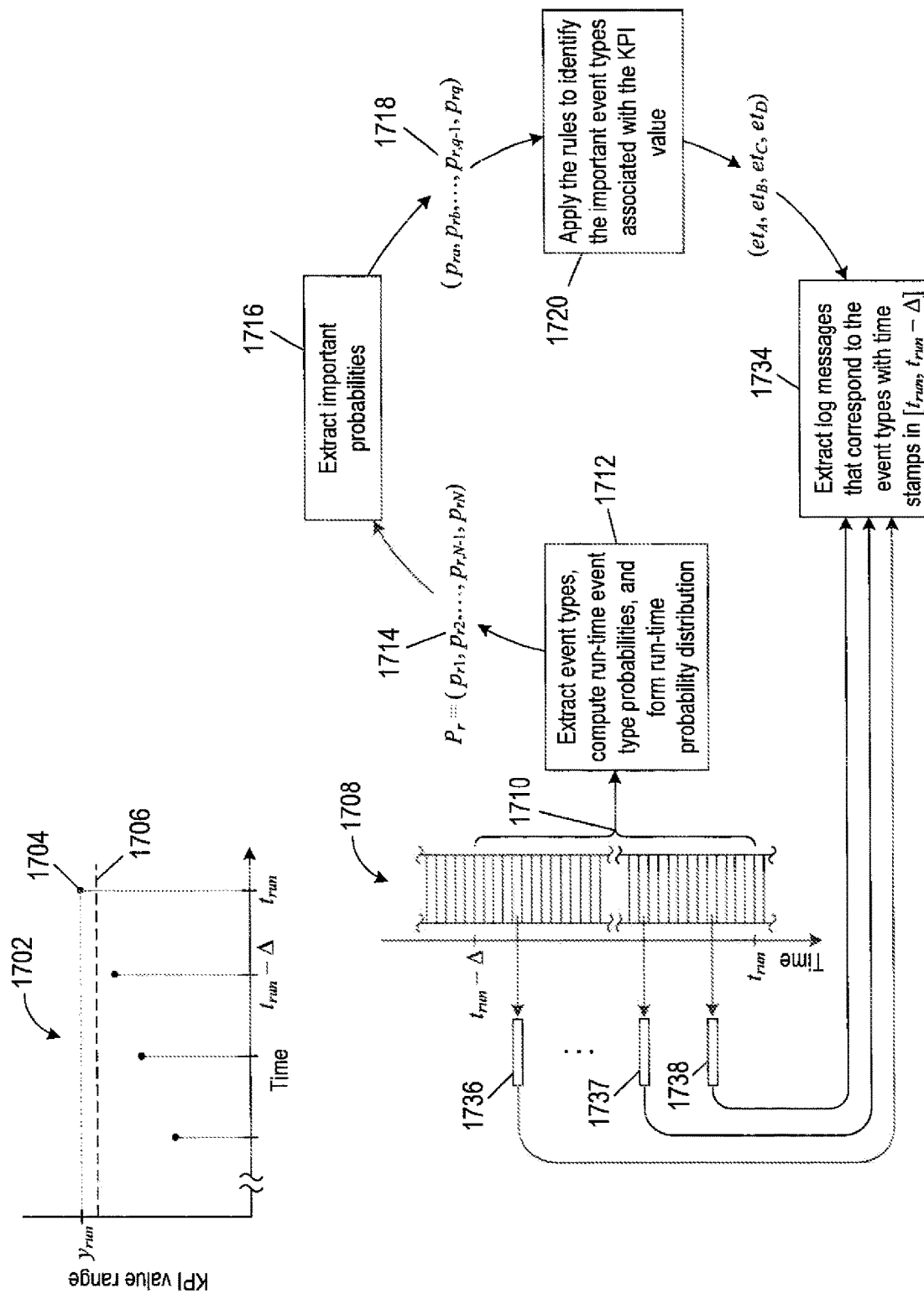
FIGS. 17A-17B show an example of determining log messages that describe probable root cause of abnormal behavior of a data center object.
Figure 17B:
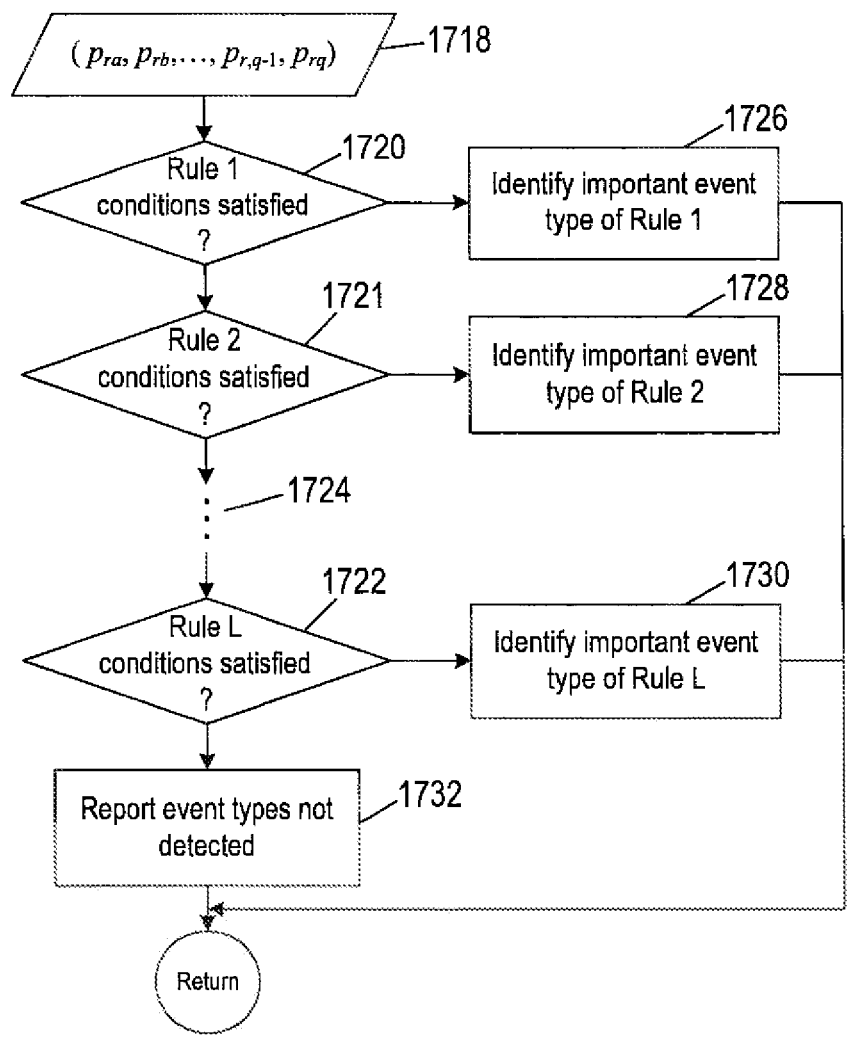

FIGS. 17A-17B show an example of determining log messages that describe the probable root cause of abnormal behavior of a data center object. FIG. 17A shows an example plot 1702 of KPI values of a KPI associated with the object. Solid dot 1704 represents a run-time KPI value, $y_{run}$, that exceeds a corresponding KPI threshold represented by dashed line 1706 at time $t_{run}$. The KPI violation of the threshold 1706 triggers display of an alert identifying the KPI and object impact by the abnormal behavior in a GUI of a system administrator's console or monitor. A user can start the process of extracting the log messages that describe events occurring in a run-time interval that ends at the time $t_{run}$ the KPI threshold violation. FIG. 17 shows a portion 1708 of a log file with log messages of the object recorded in preceding time interval $[t_{run}-\Delta, t_{run}]$ 1710. In block 1712, the event type engine 306 extracts event types from the log messages with time stamps in the time interval $[t_{run}-\Delta, t_{run}]$ 1710. The analytics engine 312 computes event type probabilities for each of the N event types as follows:

$$p_{rn} = \frac{n(et_{rn})}{N} \qquad (9)$$

where the subscript "r" denotes run time. The analytics engine 312 forms a probability distribution 1714 of the event types:

$$P_r=(p_{r1},p_{r2},\ldots,p_{r,N-1},p_{r,N}) \quad (10)$$

In block 1716, the analytics engine 312 retains only important event type probabilities 1718 identified in Equation (7) and discards non-important event type probabilities to obtain run-time important event type probabilities 1718:

$$p_r^{imp}=(p_{ra},p_{rb},\ldots,p_{r,q-1},p_{rq}) \quad (11)$$

In block 1720, the analytics engine 312 applies the conditional statements of the rules to the important event type probabilities in order to detect one or more importance event type probabilities that correspond to abnormal behavior.

FIG. 17B shows an example of rules applied to the important event type probabilities 1718. Decision blocks 1720-1722 represent three of L different rules determined from a decision-tree technique as described above. Ellipsis 1724 represents decision blocks of rules that are not shown. The important event type probabilities are compared with the conditional statements of the rules. When a subset of the important event type probabilities satisfies conditional statements of a rule, control flows to corresponding blocks 1726, 1728, and 1738. In blocks 1726, 1728, and 1730, identities of the event types that correspond to the important event types are determined and returned. For example, suppose the four important event type probabilities $p_{1A}$, $p_{2B}$, $p_{3C}$, and $p_{4D}$ are elements of $P_r^{imp}$ that satisfy the conditional statements $p_{1A} \geq T_1$, $p_{2B} \geq T_2$, $p_{3C} \leq T_3$, and $p_{4D} \geq T_4$ of a rule. The analytics engine 312 identifies the corresponding event types $et_A$, $et_B$, $et_C$, and $et_D$. In block 1732, when none of the conditional statements of the rules are satisfied, the analytics engine 312 reports that the event types cannot be determined.

Returning to FIG. 17A, in block 1734, the analytics engine 312 extracts the log messages associated with each of the event types in the time interval $[t_{run}-\Delta, t_{run}]$ 1710 from the log file 1708. Rectangles 1736-1738 represent log messages that correspond to identified event types $et_A$, $et_B$, $et_C$, and $et_D$ and are extracted from the log file 1708. The log messages are displayed in the GUI of the system administrator console or monitor.

In another implementation, the run-time event type probabilities are computed only for the event types that correspond to importance event type probabilities in Equation (7) and the operation represented by block 1716 is omitted. In still another implementation, rather than identifying only one rule that matches the important event type probabilities of $P_r^{imp}$ as described above with reference to FIG. 17B, the important event type probabilities are compared with all L rules. The analytics engine 312 returns the event types of the important event type probabilities that satisfy conditional statements of one or more of rules.

Performance problems with a data center object can originate from the data center infrastructure and/or the objects itself. While an object is executing in the data center, the analytics engine 312 computes KPIs of the object and compares run-time KPI values to corresponding KPI thresholds to detect a run-time performance problem as described above. In response to a run-time KPI value violating a corresponding KPI threshold, the analytics engine 312 sends an alert notification to the controller 310 that a KPI threshold violation has occurred and the controller 310 directs the user interface 302 to display an alert in GUI of a system administrators console or monitor.

Figure 18:
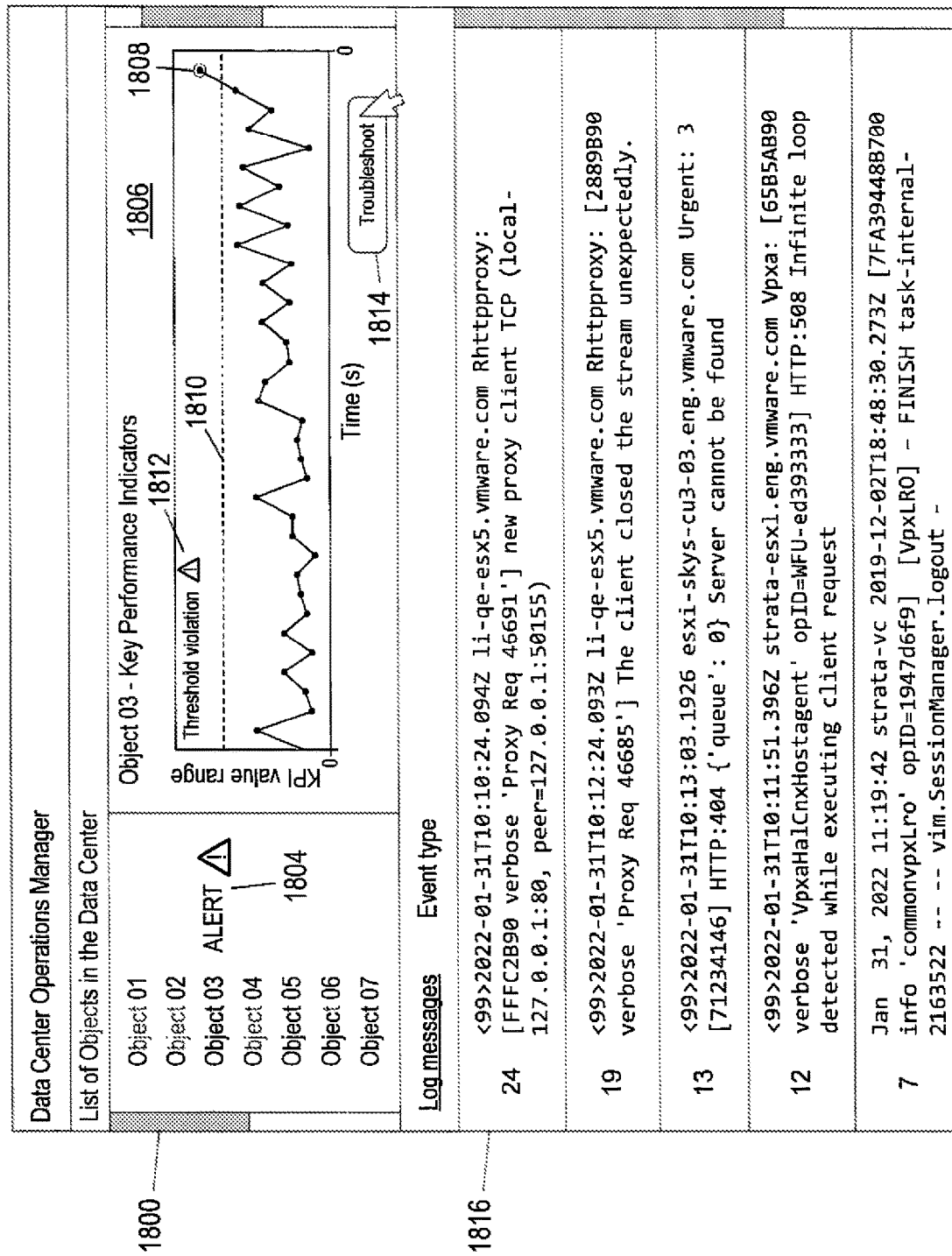
FIG. 18 shows an example graphical user interface.

FIG. 18 shows an example GUI 1800 that displays a list of objects executing in a data center in a left-hand pane 1802. Each object may have numerous KPIs that are used to monitor different aspects of the performance of an object as described above. In this example, the object identified as "Object 03" has an associated alert 1804. A user may click on the highlighted area around Object 03, creating plots of the KPIs associated with Object 03 in a right-hand pane 1806. In this example, the pane 1806 displays a plot 1808 of a KPI exhibiting the alert that corresponds to a KPI value 1808 violating KPI threshold 1810. In this example, an alert 1812 is displayed in the plot 1810. Each KPI has an associated troubleshoot button. In this example, a user clicks on the troubleshoot button 1814 to start the troubleshooting process of the KPI. In response to receiving the troubleshoot command from the user interface 302, the analytics engine 312 executes the operations described above with reference to FIGS. 17A-17B (and below with reference to FIGS. 20-23) to obtain log messages that describe the probable root cause of the performance problem indicated by the KPI threshold violation. The GUI 1800 includes pane 1816 in which the log messages are displayed. A user is able to scroll through the log messages and identify the log messages that reveal the root cause of the problem.

Figure 19:
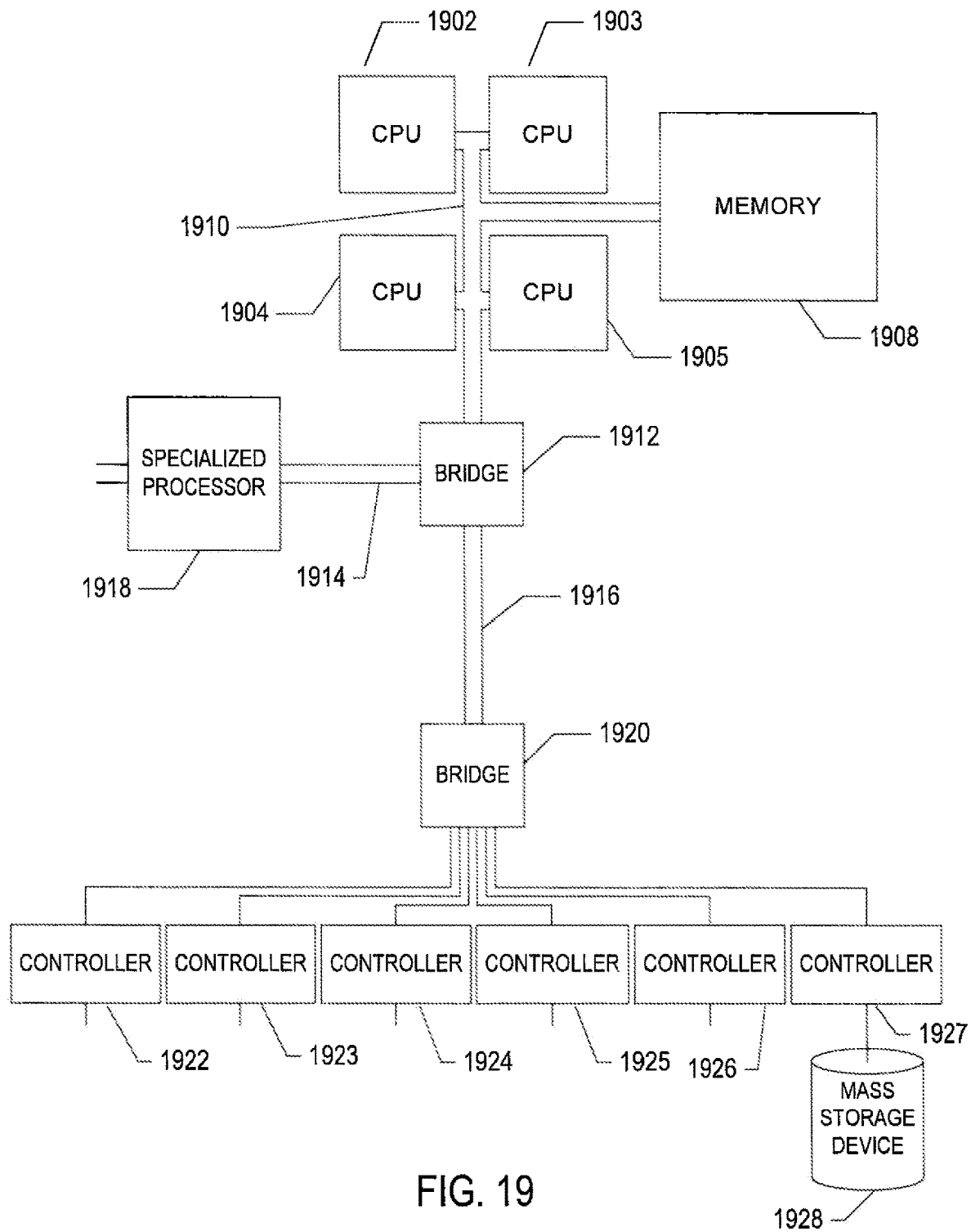
FIG. 19 shows an example architecture of a computer system that performs automated processes for resolving performance problems with objects executing in a data center.

FIG. 19 shows an example architecture of a computer system that may be used to host the operations manager 132 and perform the automated processes for resolving performance problems with objects executing in a data center. The computer system contains one or multiple central processing units ("CPUs") 1902-1905, one or more electronic memories 1908 interconnected with the CPUs by a CPU/memory-subsystem bus 1910 or multiple busses, a first bridge 1912 that interconnects the CPU/memory-subsystem bus 1910 with additional busses 1914 and 1916, or other types of high-speed interconnection media, including multiple, high-speed serial interconnects. The busses or serial interconnections, in turn, connect the CPUs and memory with specialized processors, such as a graphics processor 1918, and with one or more additional bridges 1920, which are interconnected with high-speed serial links or with multiple controllers 1922-1927, such as controller 1927, that provide access to various different types of computer-readable media, such as computer-readable medium 1928, electronic display devices, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1928 is a data-storage device, which may include, for example, electronic memory, optical or magnetic disk drive, a magnetic tape drive. USB drive, flash memory and any other such data-storage device or devices. The computer-readable medium 1928 is used to store machine-readable instructions that encode the computational methods of the operations manager 132.

The automated computer-implemented process described herein eliminates human errors in detecting probable root causes of a performance problem of an object executing in a data center. The process significantly reduces the amount time spent detecting probable root causes. The time reduction may be from days and weeks to minutes and seconds, thereby providing immediate notification of a performance problem, providing at least one probable root cause, thereby enabling rapid execution of remedial measures that correct the problem.

The methods described below with reference to FIGS. 20-23 are stored in one or more data-storage devices as machine-readable instructions that when executed by one or more processors of a computer system, such as the computer system shown in FIG. 19, determine the potential root causes of a performance problem with an object executing in a data center.

Figure 20:
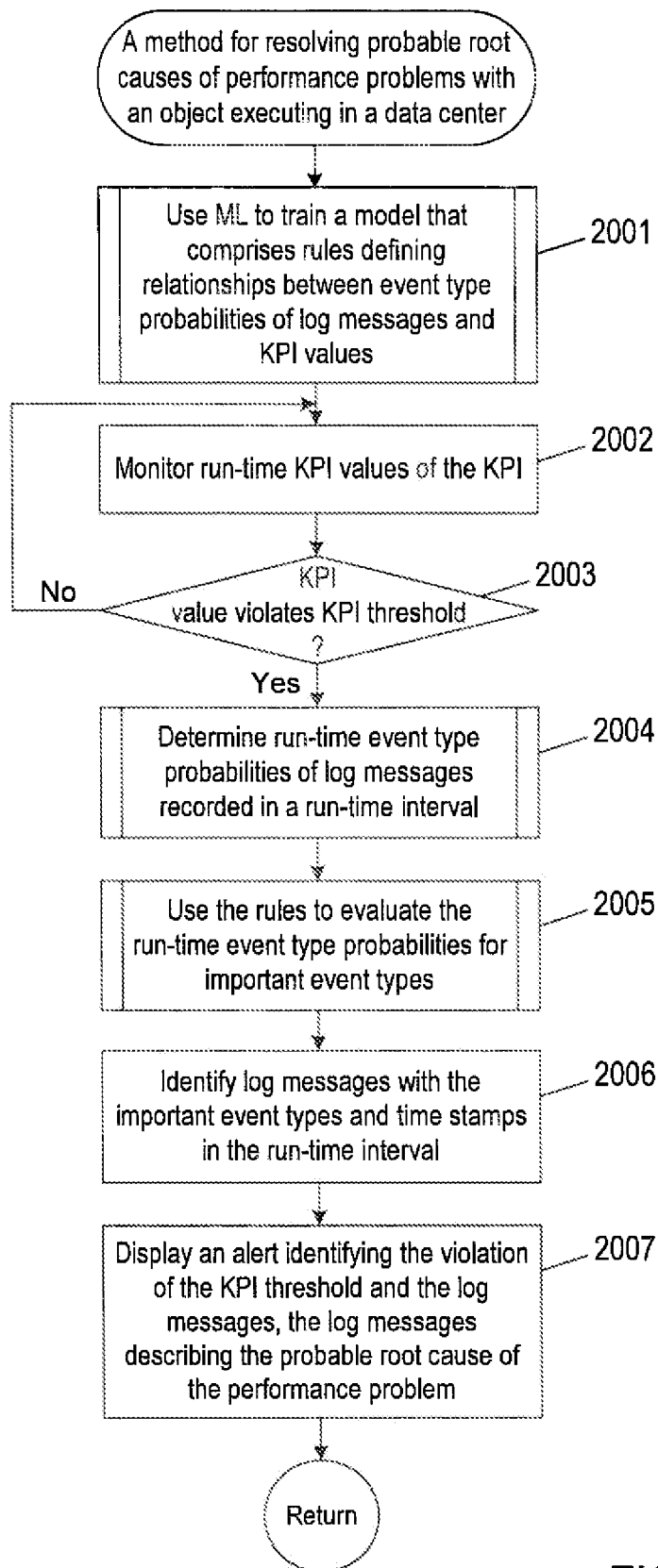
FIG. 20 is a flow diagram illustrating an example implementation of a method resolving probable root causes of performance problems with an object executing in a data center.

FIG. 20 is a flow diagram illustrating an example implementation of a method resolving probable root causes of performance problems with an object executing in a data center. In block 2001, a "use machine learning ("ML") to train a model that comprises rules defining relationships between event type probabilities of log message and KPI values" procedure is performed. An example implementation of the "use machine learning ("ML") to train a model that comprises rules defining relationships between event type probabilities of log message and KPI values" is described below with reference to FIG. 21. In block 2002, run-time KPI values of the KPI are monitored for KPI threshold violations. In decision block 2003, in response to a run-time KPI value violating the KPI threshold, control flows to block 2004. In block 2004, a "determine run-time event type probabilities of log messages recorded in a run-time interval" procedure is performed. An example implementation of the "determine run-time event type probabilities of log messages recorded in a run-time interval" is described below with reference to FIG. 22. In block 2005, a "use the rules to evaluate the run-time event type probabilities for important event types" procedure is performed. An example implementation of the "use the rules to evaluate the run-time event type probabilities for important event types" is described below with reference to FIG. 23. In block 2006, log messages with the important event types and time stamps in the run-time interval are identified. In block 2007, an alert identifying the violation of the KPI threshold and the log messages in a graphical user interface of an electronic display device as described above with reference to FIG. 18. The log messages describe the probable root cause of the performance problem.

Figure 21:
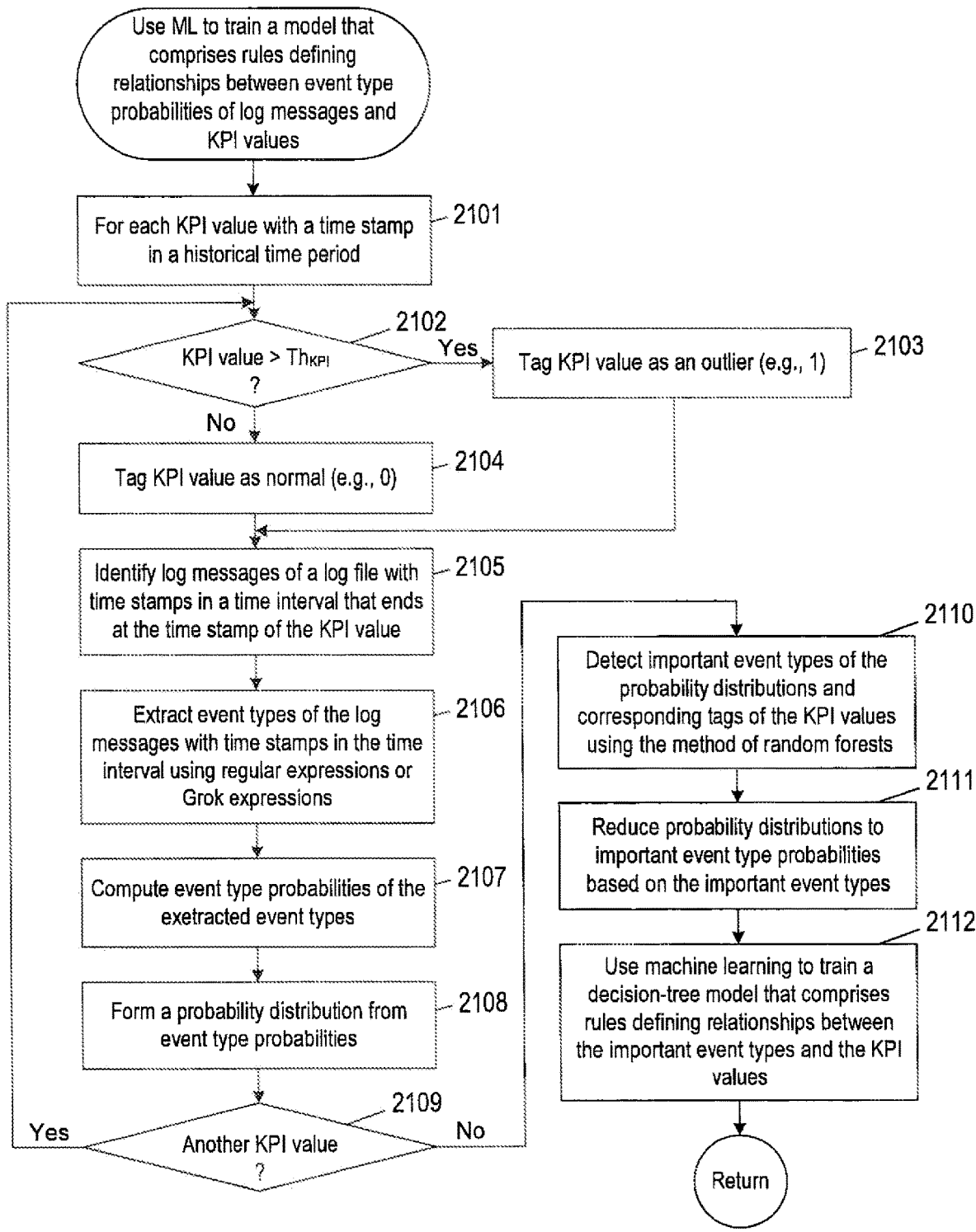
FIG. 21 is a flow diagram illustrating an example implementation of the "use machine learning ("ML") to train a model that comprises rules defining relationships between event type probabilities of log message and KPI values" procedure performed in FIG. 21.

FIG. 21 is a flow diagram illustrating an example implementation of the "use machine learning ("ML") to train a model that comprises rules defining relationships between event type probabilities of log message and KPI values" procedure performed in block 2001 of FIG. 21. A loop beginning with block 2101 repeats the computational operations represented by blocks 2102-2108 for each KPI value in a historical time period. In decision block 2102, in response to a KPI value violating a KPI threshold, control flows to block 2103 in which the KPI value is an outlier and is tagged with a binary value "1" as described above with reference to FIG. 10B. Otherwise, control flow to block 2104 in which the KPI value is normal and is tagged with a binary value "0" as described above with reference to FIG. 10B. In block 2105, log messages of a log file with time stamps in a time interval that ends with the time stamp of the KPI value are identified as described above with reference to FIG. 11. In block 2106, event types of the log messages with time stamps in the time interval are extracted as described above with reference to FIGS. 9A-9C. In block 2107, event type probabilities of the extracted event types are computed as described above with reference to Equation (5). In block 2108, a probability distribution is formed as described above with reference to Equation (6). In decision block 2109, if another KPI value is available in the historical time period, control to decision block 2102. Otherwise control flows to block 2110. In block 2110, important event types of the event types of the probability distributions are formed using the method of random forests based on the probability distributions and the corresponding tags of the KPI values as described above with reference to FIG. 13. In block 2111, the probability distributions are reduced to important event type probabilities that correspond to the important event types identified in block 2110. In block 2112, use machine learning as described above with reference to FIG. 14 to train a decision-tree model that comprises rules defining relationships between the important event types and the KPI values.

Figure 22:
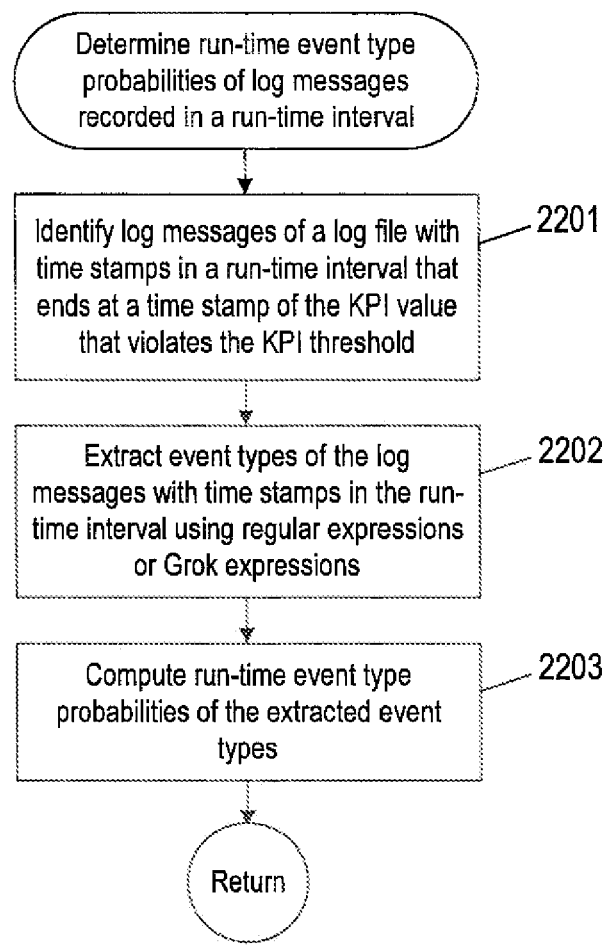
FIG. 22 is a flow diagram illustrating an example implementation of the "determine run-time event type probabilities of log messages recorded in a run-time interval" procedure performed in FIG. 22.

FIG. 22 is a flow diagram illustrating an example implementation of the "determine run-time event type probabilities of log messages recorded in a run-time interval" procedure performed in block 2004 of FIG. 22. In block 2201, log messages of a log file with time stamps in a run-time interval that ends at a time stamp of the KPI value that violates the KPK threshold are identified. In block 2202, event types of the log messages identified in block 2201 are extracted as described above with reference to FIGS. 9A-9C. In block 2203, run-time event type probabilities of the extracted event types are computed as described above with reference to Equations (9) and (10).

Figure 23:
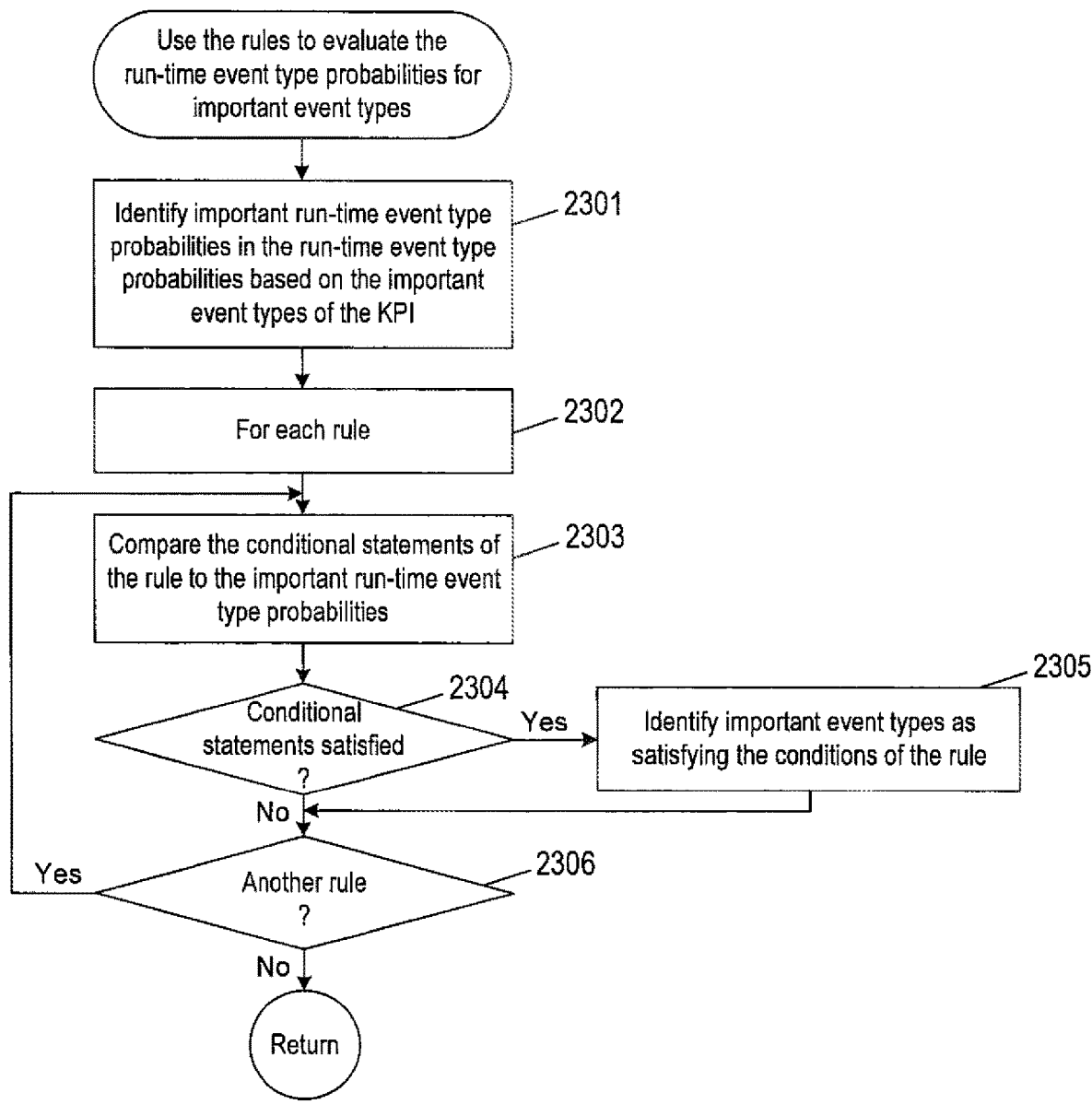
FIG. 23 is a flow diagram illustrating an example implementation of the "use the rules to evaluate the run-time event type probabilities for important event types" procedure performed in FIG. 22.

FIG. 23 is a flow diagram illustrating an example implementation of the "use the rules to evaluate the run-time event type probabilities for important event types" procedure performed in block 2005 of FIG. 22. In block 2301, important run-time event type probabilities in the run-time event type probabilities are identified based on the important event types of the KPI identified in block 2110 of FIG. 21. A loop beginning with block 2302 repeats the computational operations represented by blocks 2302-2305 for each of the rules obtained in block 2112. In block 2303, the important run-time even type distributions are compared against the conditional statements of the rule. In decision block 2304, in response to the conditional statements being satisfied, control flows to block 2305. In block 2305, the important event types of the important event type probabilities that satisfy the conditional statements of the rule are identified. In decision block 2306, blocks 2302-2305 are repeated for another rule.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, stored in one or more data-storage devices and executed using one or more processors of a computer system, for resolving probable root causes of performance problems with an object executing in a data center, the method comprising:
using machine learning to train a model that comprises rules defining relationships between probabilities of event types of log messages and values of a key performance indicator ("KPI") of the object over a historical time period;
in response to detecting a run-time KPI violation of a KPI threshold, determining probabilities of event types of log messages recorded in a run-time interval;

using the rules to evaluate the probabilities of event types of the log messages recorded in the run-time interval for important event types;
identifying log messages with the important event types generated in the run-time interval;
displaying an alert identifying the KPI threshold violation and the log messages in a graphical user interface of an electronic display device, the log messages describing the probable root cause of the performance problem; and
executing remedial measures to correct the performance problem, the remedial measures including spinning up one or more clones of the object on one or more server computers and migrating the object to a server computer to optimize use of data center resources.

2. The method of claim 1 wherein using machine learning to train the model comprises:
for each KPI in a historical time period repeat operations comprising:
tagging KPI values that violate a KPI threshold with a first tag;
tagging KPI values that do not violate the KPI threshold with second tag;
identifying log messages of a log file with time stamps in a time interval that ends with a time stamp of the KPI value;
extracting event types of the log messages with time stamps in the time interval
computing event type probabilities of the extracted event types: and
forming a probability distribution from the event type probabilities.

3. The method of claim 2 further comprising:
detecting important event types of the probability distributions using random forests based on the probability distributions and the corresponding tags of the KPI values;
reducing the probability distributions to important event type probabilities that correspond to the important event types; and
using machine learning to train a decision-tree model that comprises rules defining relationships between the important event types and the KPI values.

4. The method of claim 1 wherein determining probabilities of event types of the log messages recorded in the run-time interval comprises:
identifying log messages of a log file with time stamps in the run-time interval that ends at a time stamp of the KPI value that violates the KPI threshold;
extracting event types of the log messages; and
computing run-time event type probabilities of the extracted event types in the run-time interval.

5. The method of claim 1 wherein using the rules to evaluate the event type probabilities for important event types comprises:
identifying important run-time event type probabilities in the run-time event type probabilities based on important event types; and
for each of the rules of the model repeat operations comprising:
comparing the important run-time even type distributions to the conditional statements of the rule, and
in response to the conditional statements being satisfied, identifying the important event types of the important event type probabilities that satisfy the conditional statements of the rule.

6. A computer system for resolving probable root causes of performance problems with an object executing in a data center, the computer system comprising:
one or more processors;
one or more data-storage devices; and
machine-readable instructions stored in the one or more data-storage devices that when executed using the one or more processors control the system to perform operations comprising:
using machine learning to train a model that comprises rules defining relationships between probabilities of event types of log messages and values of a key performance indicator ("KPI") of the object over a historical time period;
in response to detecting a run-time KPI violation of a KPI threshold, determining probabilities of event types of log messages recorded in a run-time interval;
using the rules to evaluate the probabilities of event types of the log messages recorded in the run-time interval for important event types;
identifying log messages with the important event types generated in the run-time interval;
displaying an alert identifying the KPI threshold violation and the log messages in a graphical user interface of an electronic display device, the log messages describing the probable root cause of the performance problem; and
executing remedial measures to correct the performance problem, the remedial measures including spinning up one or more clones of the object on one or more server computers and migrating the object to a server computer to optimize use of data center resources.

7. The system of claim 6 wherein using machine learning to train the model comprises:
for each KPI in a historical time period repeat operations comprising:
tagging KPI values that violate a KPI threshold with a first tag;
tagging KPI values that do not violate the KPI threshold with second tag;
identifying log messages of a log file with time stamps in a time interval that ends with a time stamp of the KPI value;
extracting event types of the log messages with time stamps in the time interval;
computing event type probabilities of the extracted event types; and
forming a probability distribution from the event type probabilities.

8. The system of claim 7 further comprising:
detecting important event types of the probability distributions using random forests based on the probability distributions and the corresponding tags of the KPI values;
reducing the probability distributions to important event type probabilities that correspond to the important event types; and
using machine learning to train a decision-tree model that comprises rules defining relationships between the important event types and the KPI values.

9. The system of claim 6 wherein determining probabilities of event types of the log messages recorded in the run-time interval comprises:

identifying log messages of a log file with time stamps in the run-time interval that ends at a time stamp of the KPI value that violates the KPI threshold;

extracting event types of the log messages; and computing run-time event type probabilities of the extracted event types in the run-time interval.

10. The system of claim 6 wherein using the rules to evaluate the event type probabilities for important event types comprises:

identifying important run-time event type probabilities in the run-time event type probabilities based on important event types; and for each of the rules of the model repeat operations comprising:

comparing the important run-time even type distributions to the conditional statements of the rule, and in response to the conditional statements being satisfied, identifying the important event types of the important event type probabilities that satisfy the conditional statements of the rule.

11. A non-transitory computer-readable medium having instructions encoded thereon for enabling one or more processors of a computer system to perform operations comprising:

using machine learning to train a model that comprises rules defining relationships between probabilities of event types of log messages and values of a key performance indicator ("KPI") of an object of a data center over a historical time period:

in response to detecting a run-time KPI violation of a KPI threshold, determining probabilities of event types of log messages recorded in a run-time interval;

using the rules to evaluate the probabilities of event types of the log messages recorded in the run-time interval for important event types;

identifying log messages with the important event types generated in the run-time interval;

displaying an alert identifying the KPI threshold violation and the log messages in a graphical user interface of an electronic display device, the log messages describing the probable root cause of the performance problem; and executing remedial measures to correct the performance problem, the remedial measures including spinning up one or more clones of the object on one or more server computers and migrating the object to a server computer to optimize use of data center resources.

12. The medium of claim 11 wherein using machine learning to train the model comprises:

for each KPI in a historical time period repeat operations comprising:

tagging KPI values that violate a KPI threshold with a first tag;

tagging KPI values that do not violate the KPI threshold with second tag;

identifying log messages of a log file with time stamps in a time interval that ends with a time stamp of the KPI value;

extracting event types of the log messages with time stamps in the time interval;

computing event type probabilities of the extracted event types; and forming a probability distribution from the event type probabilities.

13. The medium of claim 12 further comprising detecting important event types of the probability distributions using random forests based on the probability distributions and the corresponding tags of the KPI values;

reducing the probability distributions to important event type probabilities that correspond to the important event types; and using machine learning to train a decision-tree model that comprises rules defining relationships between the important event types and the KPI values.

14. The medium of claim 11 wherein determining probabilities of event types of the log messages recorded in the run-time interval comprises:

identifying log messages of a log file with time stamps in the run-time interval that ends at a time stamp of the KPI value that violates the KPI threshold;

extracting event types of the log messages; and computing run-time event type probabilities of the extracted event types in the run-time interval.

15. The medium of claim 11 wherein using the rules to evaluate the event type probabilities for important event types comprises:

identifying important run-time event type probabilities in the run-time event type probabilities based on important event types; and for each of the rules of the model repeat operations comprising:

comparing the important run-time even type distributions to the conditional statements of the rule, and in response to the conditional statements being satisfied, identifying the important event types of the important event type probabilities that satisfy the conditional statements of the rule.

\* \* \* \* \*